United States Patent
Yagyu

(10) Patent No.: US 12,050,694 B2
(45) Date of Patent: Jul. 30, 2024

(54) RULE GENERATION APPARATUS, RULE GENERATION METHOD, AND COMPUTER-READABLE RECORDING MEDIUM

(71) Applicant: NEC Corporation, Tokyo (JP)

(72) Inventor: Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 270 days.

(21) Appl. No.: 17/616,219

(22) PCT Filed: May 18, 2020

(86) PCT No.: PCT/JP2020/019646
§ 371 (c)(1),
(2) Date: Dec. 3, 2021

(87) PCT Pub. No.: WO2020/246227
PCT Pub. Date: Dec. 10, 2020

(65) Prior Publication Data
US 2022/0237302 A1  Jul. 28, 2022

(30) Foreign Application Priority Data

Jun. 6, 2019 (WO) ................... PCT/JP2019/022643

(51) Int. Cl.
G06F 21/57 (2013.01)
G06F 21/56 (2013.01)

(52) U.S. Cl.
CPC .......... *G06F 21/577* (2013.01); *G06F 21/566* (2013.01); *G06F 2221/034* (2013.01)

(58) Field of Classification Search
CPC ........ G06F 21/53; G06F 21/577; G06F 21/00; G06F 21/566; G06F 2221/034; G06F 21/552; H04L 63/1433; H04L 63/1425
See application file for complete search history.

(56) References Cited

U.S. PATENT DOCUMENTS

| | | | |
|---|---|---|---|
| 10,043,001 B2 * | 8/2018 | Ghosh | ..................... G06F 21/56 |
| 2006/0191010 A1 | 8/2006 | Benjamin | |
| 2006/0253906 A1 * | 11/2006 | Rubin | ..................... H04L 63/20 726/23 |
| 2008/0098476 A1 | 4/2008 | Syversen | |
| 2018/0063171 A1 | 3/2018 | Yamada et al. | |

(Continued)

FOREIGN PATENT DOCUMENTS

| | | | | |
|---|---|---|---|---|
| GB | 2593509 A * | 9/2021 | ............. | G06F 21/55 |
| JP | 2010-218333 A | 9/2010 | | |
| JP | 2012-068903 A | 4/2012 | | |

(Continued)

OTHER PUBLICATIONS

English translation of Written opinion for PCT Application No. PCT/JP2020/019646, mailed on Jun. 23, 2020.

(Continued)

*Primary Examiner* — Alexander Lagor
*Assistant Examiner* — Brandon Binczak

(57) ABSTRACT

A rule generation apparatus 100 is an apparatus that automatically generates rules used to analyze an attack, and includes a collection unit 200, an attack success condition generation unit 300, an attack-time history generation unit 400, and a rule generation unit 500.

15 Claims, 13 Drawing Sheets

(56) References Cited

U.S. PATENT DOCUMENTS

2018/0150638 A1* 5/2018 Adrian .................. G06F 21/577
2021/0306374 A1* 9/2021 Kanemoto .......... H04L 63/1408

FOREIGN PATENT DOCUMENTS

| JP | 2015-026182 A | 2/2015 |
| JP | 2017-033286 A | 2/2017 |
| JP | 2018-032354 A | 3/2018 |
| WO | 2006/107712 A1 | 10/2006 |

OTHER PUBLICATIONS

International Search Report for PCT Application No. PCT/JP2020/019646, mailed on Jul. 16, 2019.
Yu Tsuda et al., "Implementation of an Environment for Reproducing Targeted Attacks", IPSJ SIG Technical Internet and Operation Technology (IOT), May 15, 2014, 2014-IOT-25, 18, pp. 1-11.

* cited by examiner

Fig.3

| Login | | OS | | Application | Security Patch |
|---|---|---|---|---|---|
| user | admin | wds7 | wds10 | ofc10 | KB12345 |
| 1 | 0 | 1 | 0 | 1 | 0 |
| 0 | 1 | 1 | 0 | 1 | 0 |
| 1 | 0 | 1 | 0 | 1 | 1 |
| 0 | 1 | 1 | 0 | 1 | 1 |
| 1 | 0 | 0 | 1 | 1 | 0 |
| 0 | 1 | 0 | 1 | 1 | 0 |
| 1 | 0 | 0 | 1 | 1 | 1 |
| 0 | 1 | 0 | 1 | 1 | 1 |

Fig.4

| Login | | OS | | Application | Security Patch | Attack Succeed |
|---|---|---|---|---|---|---|
| user | admin | wds7 | wds10 | ofc10 | KB12345 | |
| 1 | 0 | 1 | 0 | 1 | 0 | 1 |
| 0 | 1 | 1 | 0 | 1 | 0 | 1 |
| 1 | 0 | 1 | 0 | 1 | 1 | 0 |
| 0 | 1 | 1 | 0 | 1 | 1 | 0 |
| 1 | 0 | 0 | 1 | 1 | 0 | 1 |
| 0 | 1 | 0 | 1 | 1 | 0 | 1 |
| 1 | 0 | 0 | 1 | 1 | 1 | 0 |
| 0 | 1 | 0 | 1 | 1 | 1 | 0 |

RULE GENERATION APPARATUS, RULE GENERATION METHOD, AND COMPUTER-READABLE RECORDING MEDIUM

This application is a National Stage Entry of PCT/JP2020/019646 filed on May 18, 2020, which claims priority from PCT Patent Application PCT/JP2019/022643 filed on Jun. 6, 2019, the contents of all of which are incorporated herein by reference, in their entirety.

TECHNICAL FIELD

The invention relates to a rule generation apparatus and a rule generation method that generate rules used in security operations, and furthermore relates to a computer-readable recording medium in which a program for realizing the apparatus and method is recorded.

BACKGROUND ART

There is a growing need for SOC (Security Operation Centers), CSIRT (Computer Security Incident Response Teams), and the like as security measures against threats from cyber attacks. However, in SOCs, CSIRTs, and the like, security operations are based on the experience and knowledge of analysts, and thus the experience and knowledge of the analysts affect the accuracy of security operations.

Proposals for supporting security operations have therefore been made. Patent Document 1 discloses a technique that supports security operations by presenting information on cyber attacks that are similar to each other in a manner which is easy for operators and analysts to understand. According to this technique, when information on a cyber attack event that includes information on malware is registered in response to the detection of malware in an information processing system which is to be monitored, a search is carried out for other cyber attack events having a predetermined similarity relationship with the registered cyber attack event by referring to a storage unit that stores information on past cyber attack events.

LIST OF RELATED ART DOCUMENTS

Patent Document

Patent Document 1: Japanese Patent Laid-Open Publication No. 2018-032354

SUMMARY

Technical Problems

However, even if the technique disclosed in Patent Document 1 is used, it is difficult to improve the accuracy of security operations because such operations are still largely based on the experience and knowledge of analysts. It is also difficult for operators and analysts to check all alerts.

Accordingly, proposals have been made for improving the accuracy of security operations by using expert systems to support security operations. Currently, however, rules used in expert systems are created manually by operators (engineers and administrators) who maintain and manage the expert systems, which makes it difficult to generate practical rules.

An example object of one aspect is to provide a rule generation apparatus, a rule generation method, and a computer-readable recording medium that generate rules used in security operations.

Solution to the Problems

To achieve the above-described example object, a rule generation apparatus according to an example aspect includes:

a collection unit that collects, from a simulation system simulating a system to be attacked, environment information expressing an environment in which the simulation system is constructed, history information recorded in the simulation system, and attack information expressing whether or not an attack has been carried out on the simulation system and whether the attack has succeeded or failed;

an attack success condition generation unit that generates an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;

an attack-time history generation unit that generates attack-time history information by finding a difference between no-attack history information and attack successful-time history information for each of the attack successful-time environment information and extracting attack successful-time common history information common with the difference found from when the attack is successful, finding a difference between the no-attack history information and attack failure-time history information for each of the same attack failure-time environment information and extracting attack failure-time common history information common with the difference found from when the attack fails, and using the attack successful-time common history information and the attack failure-time common history information; and a rule generation unit that generates a rule using the attack success condition and the history information.

Additionally, to achieve the above-described example object, a rule generation method according to an example aspect includes:

collecting, from a simulation system simulating a system to be attacked, environment information expressing an environment in which the simulation system is constructed, history information recorded in the simulation system, and attack information expressing whether or not an attack has been carried out on the simulation system and whether the attack has succeeded or failed;

generating an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;

generating attack-time history information by finding a difference between no-attack history information and attack successful-time history information for each of the attack successful-time environment information and extracting attack successful-time common history information common with the difference found from when the attack is successful, finding a difference between the no-attack history information and attack failure-time history information for each of the same attack failure-time environment information and extracting attack failure-time common history information common with the difference found from when the attack fails, and using the attack successful-time common history information and the attack failure-time common history information; and generating a rule using the attack success condition and the history information.

Furthermore, to achieve the above-described example object, a computer-readable recording medium according to an example aspect stores a program including instructions that cause a computer to carry out:

collecting, from a simulation system simulating a system to be attacked, environment information expressing an environment in which the simulation system is constructed, history information recorded in the simulation system, and attack information expressing whether or not an attack has been carried out on the simulation system and whether the attack has succeeded or failed;

generating an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;

generating attack-time history information by finding a difference between no-attack history information and attack successful-time history information for each of the attack successful-time environment information and extracting attack successful-time common history information common with the difference found from when the attack is successful, finding a difference between the no-attack history information and attack failure-time history information for each of the same attack failure-time environment information and extracting attack failure-time common history information common with the difference found from when the attack fails, and using the attack successful-time common history information and the attack failure-time common history information; and generating a rule using the attack success condition and the history information.

Advantageous Effects of the Invention

According to one example aspect, rules used in security operations can be generated.

BRIEF DESCRIPTION OF THE DRAWINGS

FIG. 3 is a diagram illustrating an example of a data structure of environment information.

FIG. 4 is a diagram illustrating an example of a data structure of successful attack information.

EXAMPLE EMBODIMENT

Figure 1:
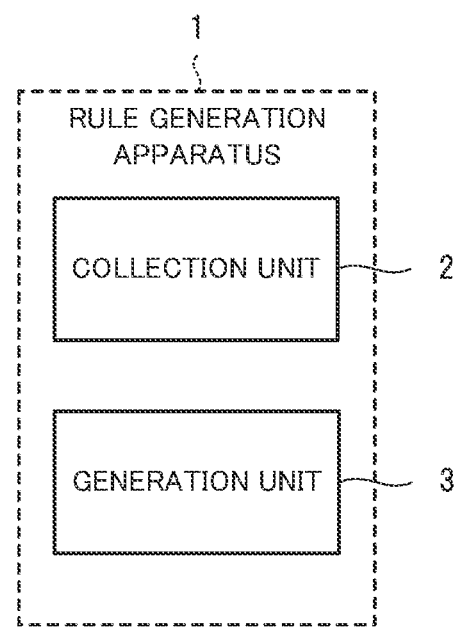
FIG. 1 is a diagram illustrating an example of a rule generation apparatus.

Example embodiments will be described below with reference to the drawings. In the drawings described below, elements having identical or corresponding functions will be assigned the same reference signs, and redundant descriptions thereof may be omitted.

First Example Embodiment

First, the configuration of a rule generation apparatus 1 according to a first example embodiment will be described with reference to FIG. 1. FIG. 1 is a diagram illustrating an example of the rule generation apparatus.

In the first example embodiment, an attack is carried out on a simulation system using an attack scenario; environment information, history information, and attack information are collected from the simulation system which has been attacked; and rules for analyzing the attack (security operations) are generated automatically on the basis of the collected information. In other words, in the first example embodiment, practical rules that sufficiently cover domain knowledge are generated automatically.

"Attack scenario" refers to information expressing an attack sequence used to carry out an attack, from the device that is the origin of the attack to the device that is the target of the attack.

"Simulation system" refers to a system in which an environment is constructed for the purpose of reproducing an attack. The simulation system is a system that simulates a damage environment of an organization that is the target of an attack. The simulation system may, for example, include a system that simulates the damage environment and a system that simulates an attack environment for attacking the organization that is the target of the attack. Furthermore, the simulation system may implement the environment for reproducing the attack in a virtual environment.

A simulation system is used because it is not possible to attack a real system in operation, and the attack is therefore carried out on a simulation system.

The elements constituting an environment (the damage environment, the attack environment, or both) are, for example, computers (servers, terminals), OSs (Operating Systems), software, networks, communications, settings, and the like.

Apparatus Configuration

The rule generation apparatus 1 illustrated in FIG. 1 is an apparatus that generates rules for use in security operations. As illustrated in FIG. 1, the rule generation apparatus 1 includes a collection unit 2 and a generation unit 3.

Of these, the collection unit 2 collects the environment information, the history information, and the attack information of the simulation system that has been attacked. The generation unit 3 generates rules used to analyze the attack on the simulation system.

The environment information is information expressing the environment constructed in the simulation system. The history information is information used in the simulation system. The attack information is information about the attack carried out on the simulation system.

In the first example embodiment, an attack is carried out on a simulation system using an attack scenario; environment information, history information, and attack information are collected from the simulation system which has been attacked; and rules for analyzing the attack (security operations) can be generated on the basis of the collected information. In other words, in the first example embodiment, practical rules that sufficiently cover domain knowledge can be generated automatically.

Note that "attack scenario" refers to information expressing an attack sequence used to carry out an attack, from the device that is the origin of the attack to the device that is the target of the attack.

System Configuration

Figure 2:
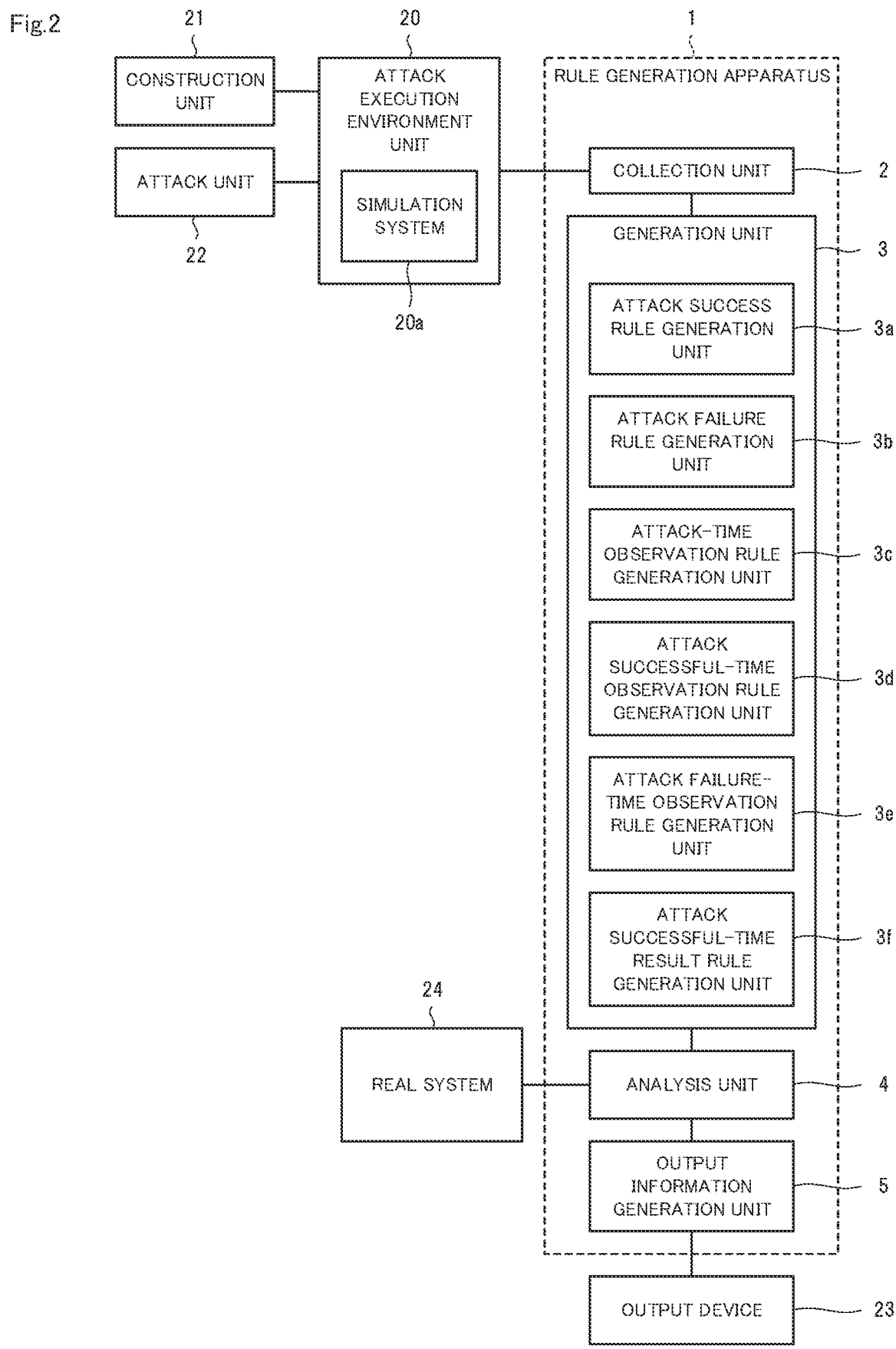
FIG. 2 is a diagram illustrating an example of a system including the rule generation apparatus.

Next, the configuration of the rule generation apparatus 1 according to the first example embodiment will be described in more detail with reference to FIG. 2. FIG. 2 is a diagram illustrating an example of a system including the rule generation apparatus.

As illustrated in FIG. 2, the rule generation apparatus 1 according to the first example embodiment includes an analysis unit 4 and an output information generation unit 5 in addition to the collection unit 2 and the generation unit 3. Additionally, as illustrated in FIG. 2, the system including the rule generation apparatus 1 includes an attack execution environment unit 20, a construction unit 21, an attack unit 22, an output device 23, and a real system 24.

In the system illustrated in FIG. 2, the rule generation apparatus 1, the attack execution environment unit 20, the construction unit 21, and the attack unit 22 are illustrated as separate devices, but it should be noted that two or more of these elements may be implemented as a single device.

As illustrated in FIG. 2, the generation unit 3 includes an attack success rule generation unit 3a, an attack failure rule (attack countermeasure rule) generation unit 3b, an attack-time observation rule generation unit 3c, an attack successful-time observation rule generation unit 3d, an attack failure-time observation rule generation unit 3e, and an attack successful-time result rule generation unit 3f.

The attack execution environment unit 20 is a device used to construct a simulation system 20a. Specifically, the attack execution environment unit 20 is constituted by one or more information processing apparatuses such as physical server computers.

A system constructed from, for example, a physical layer, an emulation layer, a simulation layer, a stub layer, and the like is conceivable as the simulation system 20a. In addition, OSs, software, hardware, networks, virtual machines, and the like are constructed on each layer.

The construction unit 21 constructs the simulation system 20a in the attack execution environment unit 20. Specifically, the construction unit 21 constructs different types of the simulation system 20a in the attack execution environment unit 20 by changing the environment. Using the construction unit 21 in this manner makes it possible to comprehensively reproduce conceivable virtual environments.

The attack unit 22 carries out an attack on the simulation system 20a on the basis of an attack scenario. Specifically, the attack unit 22 carries out an attack on part or all of the simulation system 20a, using a plurality of different attack scenarios. In this manner, the attack unit 22 can attempt various conceivable attacks on the simulation system 20a while changing the attack scenario, which makes it possible to cover all conceivable attacks.

The output device 23 obtains output information, which has been converted into an output-ready format by the output information generation unit 5, and outputs a generated image, audio, and the like on the basis of the output information. The output device 23 is, for example, an image display device or the like that uses liquid crystals, organic EL (Electro Luminescence), or a CRT (Cathode Ray Tube). Furthermore, the image display device may include an audio output device such as a speaker or the like. The output device 23 may be a printing device such as a printer or the like. The output information will be described in detail later.

The rule generation apparatus will be described in detail.

The collection unit 2 collects information from the simulation system 20a and the like, constructed in the attack execution environment unit 20, that have been attacked on the basis of the attack scenario, and stores the collected information in a storage unit (not shown).

Specifically, the collection unit 2 collects the environment information and the history information for each of environments in a no-attack state. The collection unit 2 also collects the environment information and the history information for each of the environments in an attack state. The collection unit 2 then stores the information that has been collected in the storage unit as collected information.

The storage unit may be provided in, for example, the rule generation apparatus 1, or may be provided outside the rule generation apparatus 1. Furthermore, the storage unit may be constituted by a plurality of storage units.

The environment information is, for example, information about the environments constructed in the simulation system 20a, such as networks, host computers, OSs, applications, login privileges, and the like. The environment information may include other factors that affect whether or not an attack on the real system 24 is possible.

The history information is information used by the simulation system, such as, for example, log information, packet information, setting information, process information, event information, service port information, and file information.

The history information may be stored in the storage unit after being classified, for example, on the basis of the content of the attack information, into (1) a set of history information collected in the no-attack state (a no-attack history set), or a set of history information collected in the attack state (an attack history set), which will be described below.

The attack history set is, for example, (2) a pre-successful attack history set, (3) a pre-failed attack history set, (4) a successful attack underway history set, (5) a failed attack underway history set, (6) a post-successful attack history set, (7) a post-failed attack history set, and the like.

(2) The pre-successful attack history set is a set of history information classified when an attack result in the attack information indicates a successful attack and date/time information in the history information indicates a date/time before the start of the attack. (3) The pre-failed attack history set is a set of history information classified when the attack result in the attack information indicates a failed attack and the date/time information in the history information indicates a date/time before the start of the attack.

(4) The successful attack underway history set is a set of history information classified when the attack result in the attack information indicates a successful attack and the date/time information in the history information indicates a date/time when the attack was underway. (5) The failed attack underway history set is a set of history information classified when the attack result in the attack information indicates a failed attack and the date/time information in the history information indicates a date/time when the attack was underway.

(6) The post-successful attack history set is a set of history information classified when the attack result in the attack information indicates a successful attack and the date/time information in the history information indicates a date/time after the end of the attack. (7) The post-failed attack history set is a set of history information classified when the attack result in the attack information indicates a failed attack and the date/time information in the history information indicates a date/time after the end of the attack.

The classification method will be described in detail. The collection unit 2 first executes masking, which is a known technique, on the history information. For example, the masking is a process performed on the part of the information in the history information that changes with each execution, such as the date/time information, a process ID, a dynamically-assigned port number, and the like.

Next, the collection unit 2 classifies the masked history information into (1) a no-attack history set and an attack history set. The generation unit 3 then refers to the date/time information included in the history information, and classifies the history information into the sets indicated by (2) to (7) on the basis of information expressing an attack duration and the attack result included in the attack information.

Note that if the attack has succeeded, the attack may be further classified on the basis of a predefined result (e.g., program execution, file content rewriting, file reading, deletion, acquisition of operator privileges, and the like).

The attack information is information about the attack carried out on the simulation system, including, for example, information about an attack type, the attack duration, the attack result, and the like.

The attack type is information expressing, for example, a sequence of the attack, a vulnerability exploited in the attack, a module, and the like. The attack duration is information expressing, for example, an attack start date/time, an attack end date/time, and the like.

The attack result is information expressing, for example, whether the attack has succeeded or failed. Whether an attack has succeeded or failed is determined by whether or not a predefined result has been realized. Predefined results include, for example, program execution, file content rewriting, file reading, deletion, acquisition of operator privileges, and the like.

The attack information may also include an attack probability. The reason for this is that an attack may not succeed in a single attempt. The attack probability refers to the probability of success when an attack is attempted multiple times. For example, if an attack is attempted ten times in the same environment and succeeds eight of those times, the probability of success is 0.8.

The generation unit 3 generates an attack knowledge base using the environment information pertaining to the simulation system 20a attacked using the attack scenario, the history information, and the attack information, and stores the attack knowledge base in the storage unit.

The attack knowledge base is, for example, rules and the like used to analyze an attack. The rules are, for example, (A) attack success rules, (B) attack failure rules, (C) attack-time observation rules, (D) attack successful-time observation rules, (E) attack failure-time observation rules, (F) attack successful-time result rules, and the like.

Specifically, the generation unit 3 first extracts establishment conditions for each attack scenario using the environment information pertaining to the simulation system 20a attacked on the basis of the attack scenario, the history information, and the attack information.

The establishment conditions are conditions such as, for example, (a) attack success conditions, (b) attack possible conditions, (c) attack failure conditions, (d) traces during attacks, (e) traces during successful attacks, (f) traces during failed attacks, (g) environmental changes due to successful attacks, and the like.

(a) Attack success conditions are, for example, conditions indicating which attack scenarios will be successful. (b) Attack possible conditions are, for example, conditions indicating a minimum environment required to carry out an attack. (c) Attack failure conditions are, for example, conditions indicating which attack scenarios will fail.

(d) Traces during attacks are, for example, information indicating what traces are left behind when an attack scenario is executed, for each environment. (e) Traces during successful attacks are, for example, information indicating what traces are left behind when an attack scenario is successful, for each environment. (f) Traces during failed attacks are, for example, information indicating what traces are left behind when an attack scenario fails, for each environment.

(g) Environmental changes due to successful attacks is, for example, information indicating changes in the environment that will occur in the system if the attack scenario is successful, for each environment.

The extraction of the establishment conditions will be described next. The generation unit 3 extracts the (a) attack success conditions and the (c) attack failure conditions from a difference in the environment information between when an attack is successful and when an attack has failed. The generation unit 3 also extracts the (b) attack possible conditions from a common part of the environment information when an attack is successful and when an attack has failed.

The generation unit 3 also extracts the (d) traces during attacks from differences in the history information (e.g., log information, packet information, and the like) between when there is no attack and when an attack is successful, and between when there is no attack and when an attack has failed. The generation unit 3 also extracts the (e) traces during successful attacks and the (f) traces during failed attacks from a difference in the history information between when an attack is successful and when an attack has failed.

The generation unit 3 also extracts the (g) environmental changes due to successful attacks from a difference in the environment information between when there is no attack and when an attack is successful.

Next, the generation unit 3 generates the rules indicated by (A) to (F). When an attack on the simulation system 20a has succeeded, the attack success rule generation unit 3a generates the (A) attack success rules using the (a) attack success conditions and the (b) attack possible conditions.

The attack success rule generation unit 3a will be described in detail with reference to FIG. 3. FIG. 3 is a diagram illustrating an example of a data structure of the environment information. The example in FIG. 3 illustrates an example in which the environment information has been binarized. In other words, in the example in FIG. 3, "Login" represents login privileges. "User" indicates user privileges such as "analyst", and "admin" indicates operator privileges such as "operator" ("engineer", "administrator").

Here, "1" is set when logging into the host computer using the user privileges of "user", and "0" when not. Additionally, "1" is set when logging into the host computer using the operator privileges of "admin", and "0" when not.

"wds7" and "wds10" represent the operating system "OS" installed in the host computer. "1" is set when "wds7" is used as the operating system "OS", and "0" when "wds7" is not used. "1" is set when "wds10" is used as the operating system OS, and "0" when "wds10" is not used.

"ofc10" represents an application "Application" installed in the host computer. "1" is set when "ofc10" is used as the application "Application". Note that "0" is set when "ofc10" is not used as the application "Application".

Additionally, "KB12345" represents a security patch "Security Patch" that is installed in the host computer. "1" is set when "KB12345" is used as the security patch "Security Patch", and "0" when "KB12345" is not used.

Specifically, the attack success rule generation unit 3a first extracts an environment in which an attack x has succeeded when the attack unit 22 attempted the attack x on the simulation system 20a. FIG. 4 is a diagram illustrating an example of a data structure of successful attack information. The "Attack Succeed" information illustrated in FIG. 4 indicates whether or not the attack x was successful when the attack x was attempted on the environment of the simulation system 20a. In the example illustrated in FIG. 4, the attack success rule generation unit 3a sets the value to "1" if the attack x has succeeded, and to "0" if the attack x has failed.

Next, the attack success rule generation unit 3a extracts the environment in which the attack was successful (an environment in which "attack success" is "1") using the successful information illustrated in FIG. 4 and the like. Then, on the basis of the environment, the attack success rule generation unit 3a extracts the (b) attack possible conditions under which the attack x can be executed and the (a) attack success conditions under which the attack x will succeed.

For the (b) attack possible conditions, all cases where the attack could be executed, regardless of whether the attack succeeded or failed, are indicated by "1", and the environments where the attack could be executed are extracted. Such being the case, in the example of FIG. 4, the environment in which "wds7" is "1" and "ofc10" is "1", and the environment in which "wds10" is "1" and "ofc10" is "1", are extracted as the (b) attack possible conditions.

Additionally, in the example of FIG. 4, the environment in which "wds7" is "1", "ofc10" is "1", and "KB12345" is "0", and the environment in which "wds10" is "1", "ofc10" is "1", and "KB12345" is "0", are extracted as the (a) attack success conditions.

Figure 5:
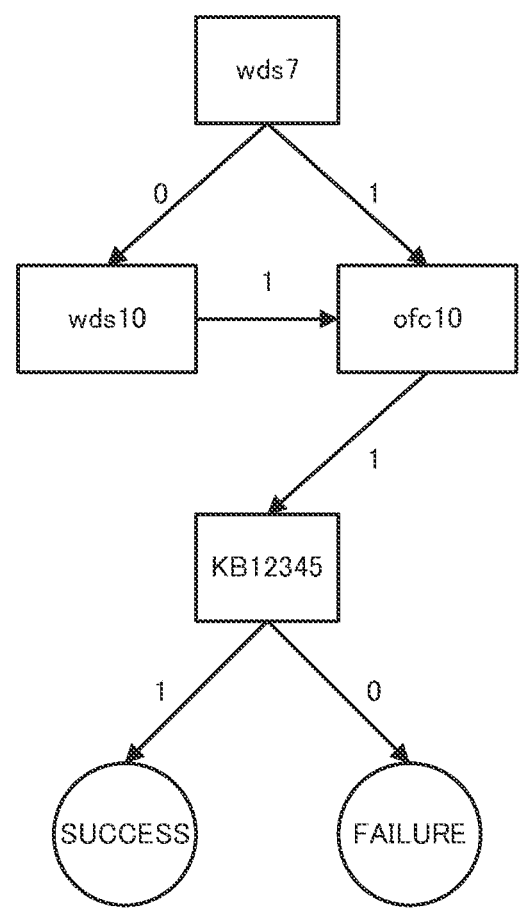
FIG. 5 is a diagram illustrating an example of a binary decision graph.

Furthermore, the attack success rule generation unit 3a may extract the (b) attack possible conditions and the (a) attack success conditions using a binary decision graph such as that illustrated in FIG. 5. FIG. 5 is a diagram illustrating an example of a binary decision graph. Note that the (a) attack success conditions may use a known algorithm such as ZDD (Zero-suppressed Binary Decision Diagram).

Next, the attack success rule generation unit 3a generates the (A) attack success rules using the extracted (b) attack possible conditions and (a) attack success conditions. For example, the (A) attack success rules indicated by Math 2 are generated by inputting the logical formulae corresponding to the (b) attack possible conditions and the (a) attack success conditions, indicated in Math 1, to the attack success rule generation unit 3a. Note that Math 3 indicates attack possible rules.

Math 1
   Logical formula for (b) attack possible conditions:
      (wds7 or wds10) & ofc10 & (Login(user) or Login (admin))
   Logical formula for (a) attack success conditions:
      ¬KB12345

Math 2
   (A) attack success rules
      AttackSucceed (_attacker, _host, _privilege, x):—
         NotSatisfy (_host, software, "KB12345")
         ExecuteAttack (_attacker, _host, privilege, x)

Math 3
   Attack possible rules
      ExecuteAttack (_attacker, _host, _privilege, x):—
         Satisfy (_host, software, "wds7")
         Satisfy (_host, software, "ofc10")
         LoginSucceed (_attacker, _host, _privilege)

Here, Satisfy (_host, software, "wds7") indicates that a condition that the software "wds7" is installed in _host is satisfied. LoginSucceed (_attacker, _host, _privilege) indicates that _attacker can log into _host with the privileges indicated by _privilege. NotSatisfy indicates a negation of Satisfy. ExecuteAttack (_attacker, _host, _privilege, x) indicates that _attacker has carried out the attack x on _host with the privileges indicated by _privilege. AttackSucceed (_attacker, _host, _privilege, x) indicates that the attack x carried out by _attacker on _host with the privileges indicated by _ privilege will succeed.

The attack failure rule generation unit 3b generates the (B) attack failure rules from the (c) attack failure conditions if the attack on the simulation system 20a has failed.

Specifically, the attack failure rule generation unit 3b generates the (B) attack failure rules indicated by Math 4 if the attack x fails in an environment in which the security patch "KB12345" has been applied.

Math 4
   (B) attack failure rules
      AttackFail (_attacker, _host, _privilege, x):—
         Satisfy (_host, software, KB12345)
         ExecuteAttack (_attacker, _privilege, _host, x)

The attack-time observation rule generation unit 3c generates the (C) attack-time observation rules from the (d) traces during attacks when an attack on the simulation system 20a has been observed.

Specifically, the attack-time observation rule generation unit 3c generates the (C) attack-time observation rules indicated by Math 5 when the attack x has been carried out and log information of "z1" has been observed as the history information.

Math 5
   (C) attack-time observation rules
      Observe (_host, log, z1):—
         ExecuteAttack (_attacker, _host, _privilege, x)

The attack successful-time observation rule generation unit 3d generates the (D) attack successful-time observation rules from the (e) traces during successful attacks when a successful attack on the simulation system 20*a* has been observed.

Specifically, the attack successful-time observation rule generation unit 3*d* generates the (D) attack successful-time observation rules indicated by Math 6 when the attack x from a host computer A to a host computer B has succeeded and packet information of "z2" from the host computer A to the host computer B is observed in the network.

Math 6

(D) attack successful-time observation rules
        Observe (_subnetA, _hostA, _hostB, z2):—
            AttackSucceed (_attacker, _hostA, _hostB, x)
            BelongTo (_hostA, _subnetA)
        Observe (_subnetB, _hostA, _hostB, z2):—
            AttackSucceed (_attacker, _hostA, _hostB, x)
            BelongTo (_hostB, _subnetB)

The attack failure-time observation rule generation unit 3*e* generates the (E) attack failure-time observation rules from the (f) traces during failed attacks when a failed attack on the simulation system 20*a* has been observed.

Specifically, the attack failure-time observation rule generation unit 3*e* generates the (E) attack failure-time observation rules indicated by Math 7 when the attack x has failed and log information of "z3" has been observed as the history information.

Math 7

(E) attack failure-time observation rules
        Observe (_host, log, z3):—
            AttackFail (_attacker, _host, _privilege, x)

Note that when the history information (traces) is binarized, "1" is set if, for example, a packet is sent to the destination port number from the host computer A to the host computer B using TCP (Transmission Control Protocol), and "0" if not. Additionally, "1" is set if, for example, there is a log "XXX" in the event log of the host computer A, and "0" if not.

The attack successful-time result rule generation unit 3*f* generates the (F) attack successful-time result rules from the (g) environmental changes due to successful attacks when the attack on the simulation system 20*a* has succeeded and a change in the environment has occurred.

Specifically, the attack successful-time result rule generation unit 3*f* generates the (F) attack successful-time result rules indicated by Math 8 when the attack x has succeeded and an environmental change in which a remote desktop service (TCP: 3389) launches has occurred.

Math 8

(F) attack successful-time result rules
        Satisfy (_host, service, rdp, tcp, 3389):—
            AttackSucceed (_attacker, _host, privilege, x)

Note that when, for example, the environmental change is binarized, "1" is set if, for example, a service launches at a predetermined TCP port in the host computer A, and "0" if not.

If the probability of success of an attack is known, that probability can also be given as attribute information for the rules. Note that the foregoing rules are simplified examples, and the rules are not limited thereto.

In this manner, in the first example embodiment, an attack is carried out on a simulation system 20*a* using an attack scenario; environment information, history information, and attack information pertaining to the simulation system 20*a* which has been attacked are collected; and rules for analyzing the attack (security operations) can be generated on the basis of the collected information. In other words, in the first example embodiment, practical rules that sufficiently cover domain knowledge can be generated automatically.

The analysis unit 4 analyzes the attack using the environment information, the history information, and the attack information collected from the system in question (the real system 24), as well the attack success rules, the attack failure rules, the attack-time observation rules, the attack successful-time observation rules, the attack failure-time observation rules, or the attack successful-time result rules, or two or more thereof.

Specifically, the analysis unit 4 collects the environment information, the history information, and the attack information from the real system 24. The analysis unit 4 also collects, from a storage unit (not shown), the attack success rules, the attack failure rules, the attack-time observation rules, the attack successful-time observation rules, the attack failure-time observation rules, or the attack successful-time result rules, or two or more thereof.

Next, the analysis unit 4 analyzes the attack using the collected information. This analysis refers to, for example, risk assessment, risk countermeasures, attack estimation, tracking, mitigation actions, monitoring enhancement, and the like.

Risk assessment analysis refers to, for example, an analysis for evaluating risks that exist in the real system 24. Risk countermeasure analysis refers to, for example, analyzing countermeasures which are effective in minimizing the risk of an attack. Attack estimation (attack analysis) refers to, for example, analysis for estimating attack scenarios.

Tracking analysis refers to, for example, analysis that predicts the next attack behavior from a specified attack and determines how far the attack has progressed. Mitigation action analysis refers to, for example, analyzing mitigation actions that should be implemented to prevent an attack from progressing any further. In other words, this is an analysis of effective defenses against the conditions that make an attack possible in order to prevent the next possible attack from occurring. Monitoring enhancement analysis refers to an analysis in which, for example, when an attack occurs, the traces observed in the attack are used to estimate the environment to be monitored and the history information to be monitored.

Using the analysis result, the output information generation unit 5 generates the output information to be used for output to the output device 23. The output information is information used to support the work of operators and analysts when, for example, the operators and analysts perform the above-described analysis work such as risk assessment, risk countermeasures, attack estimation, tracking, mitigation actions, and monitoring enhancement.

Specifically, the output information generation unit 5 generates output information used to output the risk assessment analysis result to the output device 23 in order to support the risk assessment analysis. For example, the output information generation unit 5 generates output information pertaining to an attack graph by combining the establishment conditions with the attack results, and outputs the output information to the output device 23.

Additionally, the output information generation unit 5 generates output information used to output, to the output device 23, an analysis result for risk countermeasures effective in minimizing the risk of an attack, in order to support the risk countermeasure analysis.

Additionally, the output information generation unit 5 generates output information used to output, to the output device 23, an attack scenario estimated on the basis of the traces and the current environment, in order to support the attack estimation (attack analysis).

Additionally, the output information generation unit 5 generates output information used to output, to the output device 23, a result of predicting the next attack behavior from a specified attack, in order to support the tracking analysis.

Additionally, the output information generation unit 5 generates output information used to output, to the output device 23, mitigation actions that should be implemented to prevent an attack from progressing any further (effective defense means against the conditions that make an attack possible in order to prevent the next possible attack from occurring).

Additionally, the output information generation unit 5 generates output information used to output, to the output device 23, an environment serving as a monitored location and history information to be monitored, estimated using the traces observed during the attack, in order to support monitoring enhancement.

In this manner, in the first example embodiment, presenting the analysis results to the operators and analysts analyzing an attack makes it possible to support security operations.

First Variation

A first variation will be described. Although the example in FIG. 2 illustrates the rule generation apparatus 1 including the analysis unit 4 and the output information generation unit 5, the first variation will describe a system in which the analysis unit 4 and the output information generation unit 5 are separate from the rule generation apparatus 1. The system according to the first variation may be configured as illustrated in FIG. 6, for example.

Figure 6:
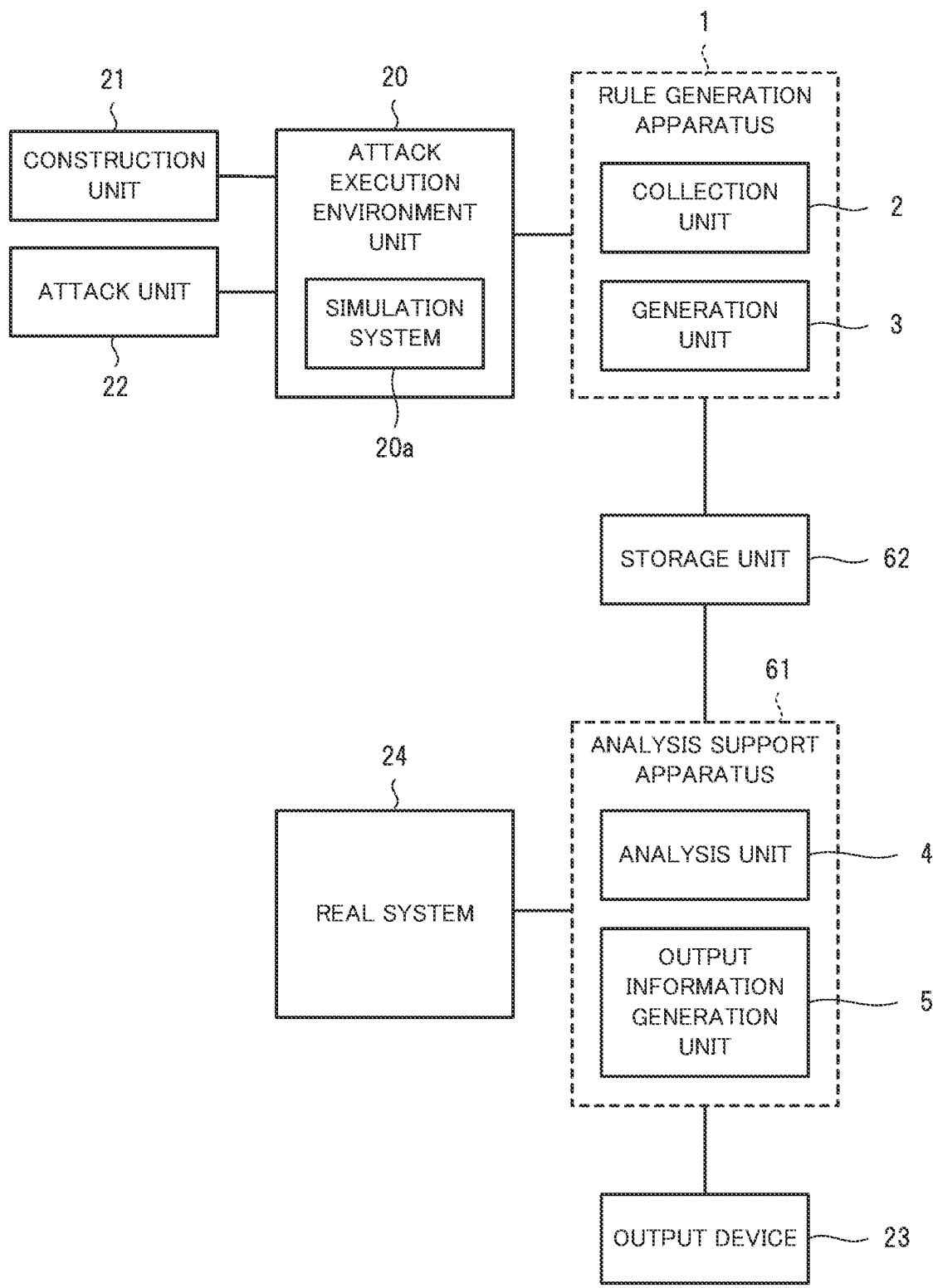
FIG. 6 is a diagram illustrating a system according to a first variation.

FIG. 6 is a diagram illustrating the system according to the first variation. In the example in FIG. 6, the rule generation apparatus 1 includes the collection unit 2 and the generation unit 3, and an analysis support apparatus 61 includes the analysis unit 4 and the output information generation unit 5.

In the example in FIG. 6, using the environment information pertaining to the simulation system 20*a* attacked using the aforementioned attack scenarios, the history information, and the attack information, the rule generation apparatus 1 generates an attack knowledge base including the (A) attack success rules, the (B) attack failure rules, the (C) attack-time observation rules, the (D) attack successful-time observation rules, the (E) attack failure-time observation rules, the (F) attack successful-time result rules, and the like, and stores the attack knowledge base in a storage unit 62.

Additionally, in the example in FIG. 6, the analysis unit 4 of the analysis support apparatus 61 obtains the collected environment information, history information, and attack information from the system in question (the real system 24). The analysis unit 4 of the analysis support apparatus 61 also collects, from the storage unit 62, the attack success rules, the attack failure rules, the attack-time observation rules, the attack successful-time observation rules, the attack failure-time observation rules, the attack successful-time result rules, or two or more thereof, of the simulation system 20*a*.

In the example in FIG. 6, the analysis unit 4 of the analysis support apparatus 61 analyzes the attack using the collected information. For example, the analysis unit 4 performs analysis such as risk assessment, risk countermeasures, attack estimation, tracking, mitigation actions, monitoring enhancement, and the like.

Using the analysis result generated by the analysis unit 4, the output information generation unit 5 of the analysis support apparatus 61 generates output information used for the output device 23 to perform an output. The output information is information used to support the work of operators and analysts when, for example, the operators and analysts perform the above-described work such as risk assessment, risk countermeasures, attack estimation, tracking, mitigation actions, and monitoring enhancement.

In this manner, according to the first variation, an attack is carried out on the simulation system 20*a* using an attack scenario; environment information, history information, and attack information are collected from the simulation system which has been attacked; and rules for analyzing the attack (security operations) can be generated on the basis of the collected information. In other words, in the first example embodiment, practical rules that sufficiently cover domain knowledge can be generated automatically.

Additionally, according to the first variation, presenting the analysis results to the operators and analysts analyzing an attack makes it possible to support security operations.

Apparatus Operations

Figure 7:
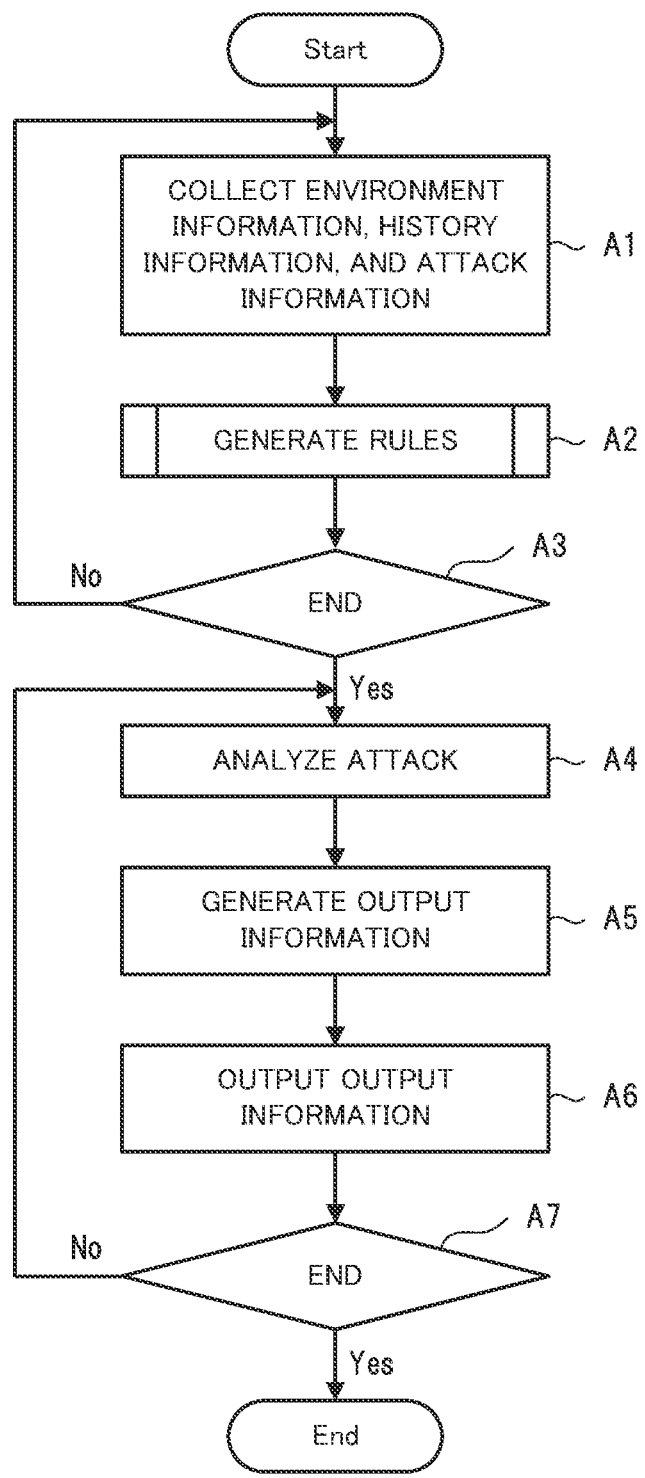
FIG. 7 is a diagram illustrating an example of operations of the rule generation apparatus.

Next, the operations of the rule generation apparatus 1 according to the first example embodiment will be described with reference to FIG. 7. FIG. 7 is a diagram illustrating an example of the operations of the rule generation apparatus. The following descriptions will refer to FIGS. 2 to 6 as appropriate. In the first example embodiment, a rule generation method is implemented by operating the rule generation apparatus 1. As such, the following descriptions of the operations of the rule generation apparatus will be given in place of descriptions of the rule generation method according to the first example embodiment.

Collection processing will be described.

As illustrated in FIG. 7, first, the collection unit 2 collects the environment information of the simulation system 20*a*, constructed in the attack execution environment unit 20, that has been attacked on the basis of the attack scenario, as well as the history information and the attack information, and stores the collected information in a storage unit (not shown) (step A1).

Specifically, in step A1, the collection unit 2 collects the environment information and the history information for each of environments in a no-attack state. Additionally, in step A1, the collection unit 2 collects the environment information and the history information for each of the environments in an attack state. Additionally, in step A1, the collection unit 2 stores the information that has been collected in the storage unit as collected information.

Note that in step A1, the collection unit 2 may classify the collected history information into sets on the basis of the content of the attack information.

Next, the generation unit 3 generates an attack knowledge base using the environment information pertaining to the simulation system 20*a* attacked using the attack scenario, the history information, and the attack information, and stores the attack knowledge base in the storage unit (step A2). In step A2, the generation unit 3 generates rules such as the (A) attack success rules, the (B) attack failure rules, the (C) attack-time observation rules, the (D) attack successful-time observation rules, the (E) attack failure-time observation rules, the (F) attack successful-time result rules, and the like.

Specifically, in step A2, first, using the environment information pertaining to the simulation system 20*a* attacked on the basis of the attack scenario, the history information, and the attack information, the generation unit 3 extracts conditions for each attack scenario, e.g., the (a) attack success conditions, the (b) attack possible conditions, the (c) attack failure conditions, the (d) traces during attacks, the (e) traces during successful attacks, the (f) traces during failed attacks, the (g) environmental changes due to successful attacks, and the like.

The generation unit 3 extracts, for example, the (a) attack success conditions and the (c) attack failure conditions from a difference in the environment information between when an attack is successful and when an attack has failed. The generation unit 3 also extracts the (b) attack possible conditions from a common part of the environment information when an attack is successful and when an attack has failed.

The generation unit 3 also extracts the (d) traces during attacks from differences in the history information (e.g., log information, packet information, and the like) between when there is no attack and when an attack is successful, and between when there is no attack and when an attack has failed. The generation unit 3 also extracts the (e) traces during successful attacks and the (f) traces during failed attacks from a difference in the history information between when an attack is successful and when an attack has failed.

The generation unit 3 also extracts the (g) environmental changes due to successful attacks from a difference in the environment information between when there is no attack and when an attack is successful.

Next, in step A2, when an attack on the simulation system 20a has succeeded, the attack success rule generation unit 3a generates the (A) attack success rules using the (a) attack success conditions and the (b) attack possible conditions.

Additionally, in step A2, the attack failure rule generation unit 3b generates the (B) attack failure rules from the (c) attack failure conditions if the attack on the simulation system 20a has failed.

Additionally, in step A2, the attack-time observation rule generation unit 3c generates the (C) attack-time observation rules from the (d) traces during attacks when an attack on the simulation system 20a has been observed.

Additionally, in step A2, the attack successful-time observation rule generation unit 3d generates the (D) attack successful-time observation rules from the (e) traces during successful attacks when a successful attack on the simulation system 20a has been observed.

Additionally, in step A2, the attack failure-time observation rule generation unit 3e generates the (E) attack failure-time observation rules from the (f) traces during failed attacks when a failed attack on the simulation system 20a has been observed.

Additionally, in step A2, the attack successful-time result rule generation unit 3f generates the (F) attack successful-time result rules from the (g) environmental changes due to successful attacks when the attack on the simulation system 20a has succeeded and a change in the environment has occurred.

Next, if an instruction to end the rule generation processing has been obtained (A3: Yes), the rule generation apparatus 1 ends the rule generation processing, whereas if the rule generation processing is to be continued (A3: No), the sequence moves to step A1.

Next, the analysis unit 4 analyzes the attack using the environment information, the history information, and the attack information collected from the system in question (the real system 24), as well as the attack success rules, the attack failure rules, the attack-time observation rules, the attack successful-time observation rules, the attack failure-time observation rules, the attack successful-time result rules, or two or more thereof, of the simulation system 20a (step A4).

Specifically, in step A4, the analysis unit 4 collects the environment information, the history information, and the attack information from the real system 24. Additionally, the analysis unit 4 collects, from the storage unit, the attack success rules, the attack failure rules, the attack-time observation rules, the attack successful-time observation rules, the attack failure-time observation rules, the attack successful-time result rules, or two or more thereof.

Next, in step A4, the analysis unit 4 analyzes the attack using the collected information. This analysis refers to, for example, risk assessment, risk countermeasures, attack estimation, tracking, mitigation actions, monitoring enhancement, and the like.

Next, using the analysis result, the output information generation unit 5 generates the output information to be used for output to the output device 23 (step A5).

Specifically, in step A5, the output information generation unit 5 generates output information used to output, to the output device 23, the risk assessment analysis result in order to support the risk assessment analysis, i.e., in order to present to operators and analysts. For example, the output information generation unit 5 generates output information pertaining to an attack graph used in the risk assessment by combining the establishment conditions with the attack results.

Additionally, in step A5, the output information generation unit 5 generates output information used to output, to the output device 23, an analysis result for risk countermeasures effective in minimizing the risk of an attack, in order to support the risk countermeasure analysis, i.e., in order to present to operators and analysts.

Additionally, in step A5, the output information generation unit 5 generates output information used to output, to the output device 23, an attack scenario estimated on the basis of the traces and the current environment, in order to support the attack estimation (attack analysis), i.e., in order to present to operators and analysts.

Additionally, in step A5, the output information generation unit 5 generates output information used to output, to the output device 23, a result of predicting the next attack behavior from a specified attack, in order to support the tracking analysis, i.e., in order to present to operators and analysts.

Additionally, in step A5, the output information generation unit 5 generates output information used to output, to the output device 23, an environment serving as a monitored location and history information to be monitored, estimated using the traces that have been observed during the attack, in order to support monitoring enhancement, i.e., in order to present to operators and analysts.

Additionally, in step A5, the output information generation unit 5 generates output information used to output, to the output device 23, mitigation actions that should be implemented to prevent an attack from progressing any further (effective defense means against the conditions that make an attack possible in order to prevent the next possible attack from occurring), i.e., in order to present to operators and analysts.

Additionally, in step A5, the output information generation unit 5 generates output information used to output, to the output device 23, an environment serving as a monitored location and history information to be monitored, estimated using the traces to be observed during the attack, in order to support monitoring enhancement, i.e., in order to present to operators and analysts.

Next, the output information generation unit 5 outputs the generated output information to the output device 23 (step A6). Then, if an instruction to end the analysis support processing has been obtained (A7: Yes), the rule generation apparatus 1 ends the analysis support processing, whereas if the analysis support processing is to be continued (A7: No), the sequence moves to step A4.

Operations of First Variation

Operations of the first variation will be described. In the first variation, the processing of steps A4 to A6 is executed using the analysis unit 4 and the output information generation unit 5 of the analysis support apparatus 61. Additionally, in the first variation, the processing of step A7 ends the analysis support processing using the analysis support apparatus 61.

Effect of First Example Embodiment

As described thus far, according to the first example embodiment, an attack is carried out on a simulation system using an attack scenario; environment information, history information, and attack information are collected from the simulation system which has been attacked; and rules for analyzing the attack (security operations) can be generated on the basis of the collected information. In other words, in the first example embodiment, practical rules that sufficiently cover domain knowledge can be generated automatically.

Additionally, presenting the analysis results to the operators and analysts analyzing an attack makes it possible to support security operations.

Program

A program according to the first example embodiment may be any program that causes a computer to execute steps A1 to A7 illustrated in FIG. 7. The rule generation apparatus and the rule generation method according to the first example embodiment can be implemented by installing the program in a computer and executing the program. In this case, a processor of the computer performs processing by functioning as the collection unit 2, the generation unit 3 (the attack success rule generation unit 3a, the attack failure rule generation unit 3b, the attack-time observation rule generation unit 3c, the attack successful-time observation rule generation unit 3d, the attack failure-time observation rule generation unit 3e, and the attack successful-time result rule generation unit 3f), the analysis unit 4, and the output information generation unit 5.

The program according to the first example embodiment may be executed by a computer system constructed from a plurality of computers. In this case, for example, each of the computers may function as any of the collection unit 2, the generation unit 3 (the attack success rule generation unit 3a, the attack failure rule generation unit 3b, the attack-time observation rule generation unit 3c, the attack successful-time observation rule generation unit 3d, the attack failure-time observation rule generation unit 3e, and the attack successful-time result rule generation unit 3f), the analysis unit 4, and the output information generation unit 5.

Second Example Embodiment

Figure 8:
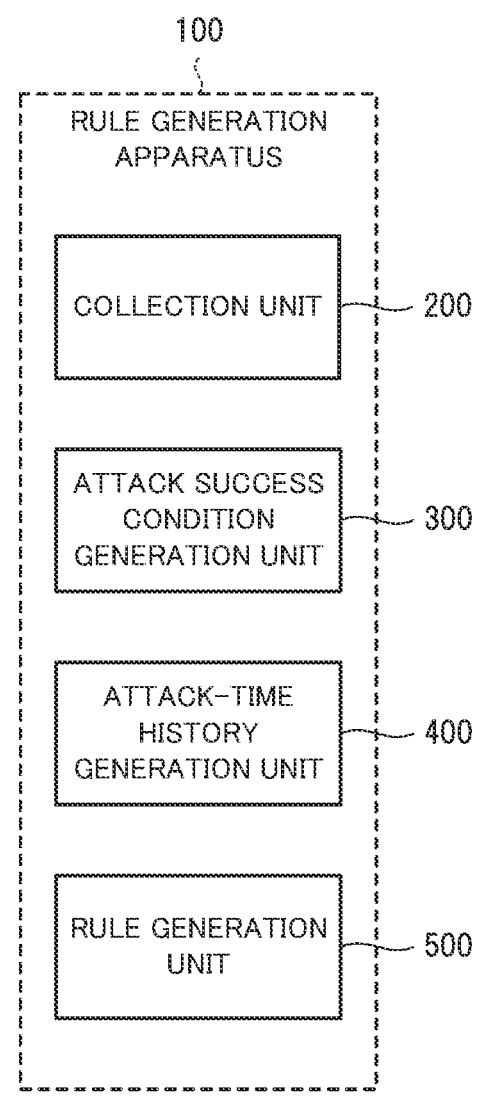
FIG. 8 is a diagram illustrating an example of a rule generation apparatus.

The configuration of a rule generation apparatus 100 according to a second example embodiment will be described with reference to FIG. 8. FIG. 8 is a diagram illustrating an example of the rule generation apparatus.

In the second example embodiment, an attack is carried out on a simulation system using an attack scenario; environment information, history information, and attack information are collected from the simulation system which has been attacked; and rules for analyzing the attack (security operations) are generated automatically on the basis of the collected information. In other words, in the second example embodiment, practical rules that sufficiently cover domain knowledge are generated automatically.

"Simulation system" refers to a system in which an environment is constructed for the purpose of reproducing an attack. The simulation system is a system that simulates a damage environment of an organization that is the target of an attack. The simulation system may, for example, include a system that simulates the damage environment and a system that simulates an attack environment for attacking the organization that is the target of the attack. Furthermore, the simulation system may implement the environment for reproducing the attack in a virtual environment.

The elements constituting an environment (the damage environment, the attack environment, or both) are, for example, computers (servers, terminals), OSs (Operating Systems), software, networks, communications, settings, and the like.

Apparatus Configuration

The rule generation apparatus 100 is an apparatus that automatically generates rules used to analyze an attack. As illustrated in FIG. 8, the rule generation apparatus 100 includes a collection unit 200, an attack success condition generation unit 300, an attack-time history generation unit 400, and a rule generation unit 500. The rule generation apparatus 100 is an information processing apparatus such as a server computer, for example.

The collection unit 200 collects, from a simulation system that simulates a system under attack, environment information expressing the environment in which the simulation system is constructed, history information recorded in the simulation system, and attack information expressing whether or not an attack has been carried out on the simulation system and whether the attack succeeded or failed.

The environment information is information expressing elements constituting the environment. The environment information is, for example, information expressing elements such as computers, OSs, software, startup services, and network communicability, and the like.

The history information is information expressing logs and the like recorded in the simulation system. The history information is information expressing logs for, for example, OSs, programs, communication, process launching and termination, command execution, file access, and the like.

The "attack information" is information about the attack that has been carried out on the simulation system. The attack information includes, for example, information expressing the type of the attack, whether or not an attack has been carried out, whether the attack succeeded or failed, and the like.

First, the attack success condition generation unit 300 uses the attack information to extract, from the environment information, attack successful-time environment information and attack failure-time environment information. Next, the attack success condition generation unit 300 finds a difference between the attack failure-time environment information including all the elements of the attack successful-time environment information, and that attack successful-time environment information. The attack success condition generation unit 300 then attaches, to the difference that has been found, exclusion information indicating a failed attack. Next, the attack success condition generation unit 300 adds the difference, to which the exclusion information has been attached, to the attack successful-time environment information. The attack success condition generation unit 300 then generates the attack success conditions using the added environment information.

Figure 9:
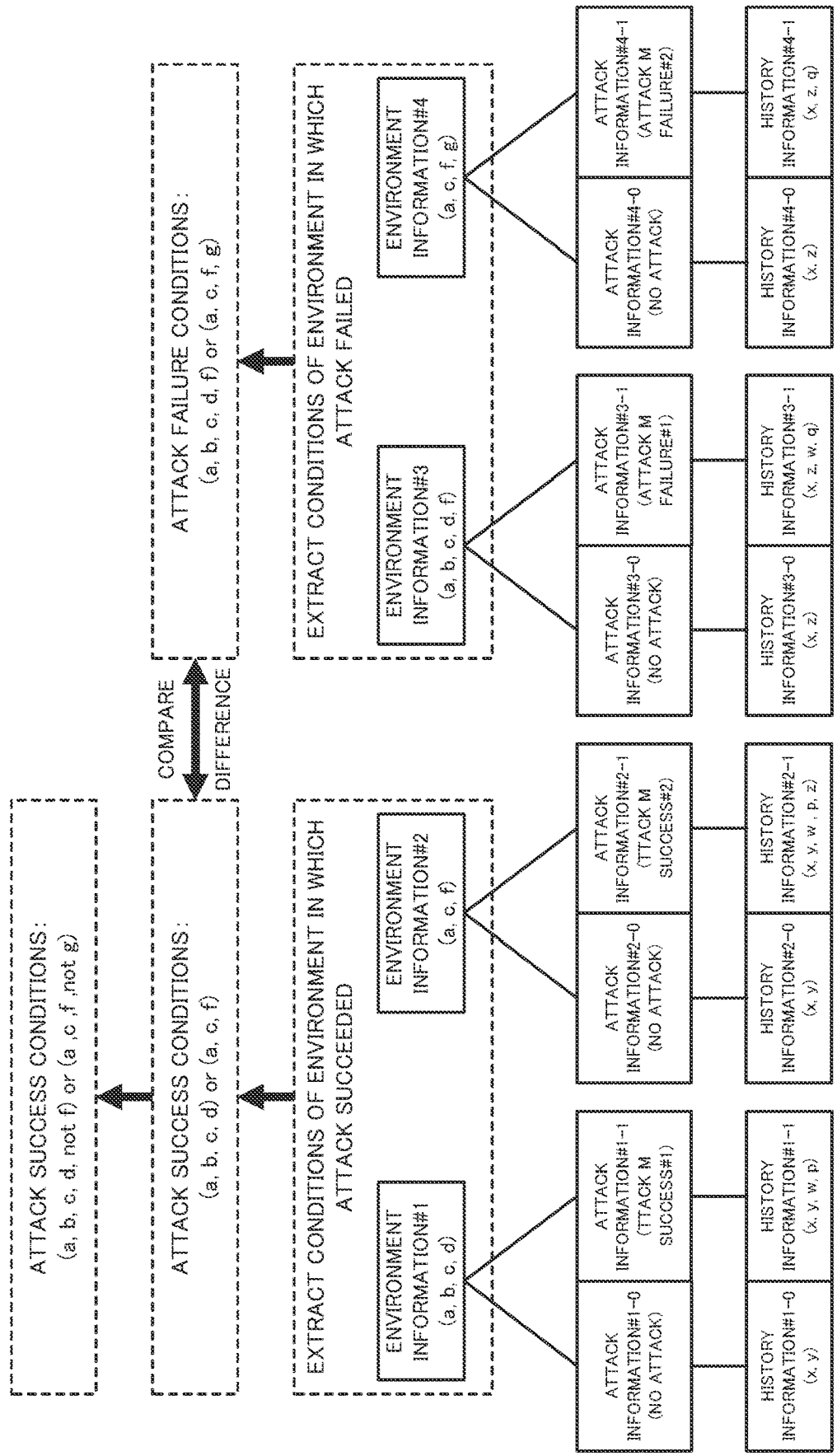
FIG. 9 is a diagram illustrating the generation of rules.

The attack success condition generation unit 300 will be described in detail with reference to FIG. 9. FIG. 9 is a diagram illustrating the generation of rules.

When the attack information indicated by Math 9 is collected by the collection unit 200 described above, the attack success condition generation unit 300 extracts the attack successful-time environment information #1(a, b, c, d) and environment information #2(a, c, f), illustrated in FIG. 9, on the basis of attack information #1-1 and #2-1, which indicate a successful attack M. In other words, an environment in which the attack M succeeds is extracted.

Math 9

Attack information #1-0: attack M, no attack
Attack information #1-1: attack M, attack, attack success #1
Attack information #2-0: attack M, no attack
Attack information #2-1: attack M, attack, attack success #2
Attack information #3-0: attack M, no attack
Attack information #3-1: attack M, attack, attack failure #1
Attack information #4-0: attack M, no attack
Attack information #4-1: attack M, attack, attack failure #2

Additionally, the attack success condition generation unit 300 extracts the attack failure-time environment information #3(a, b, c, d, f) and #4(a, c, f, g), as illustrated in FIG. 9, on the basis of the attack information #3-1 and #4-1, which indicate that the attack M has failed. In other words, an environment in which the attack M fails is extracted.

The elements (a, b, c, d, e, f, g) of the environment information described above represent the OS, software, startup services, network communicability, and the like mentioned above.

Next, the attack success condition generation unit 300 compares the environment information #1 and #2 from when the attack M has succeeded with the environment information #3 and #4 from when the attack M has failed, and determines whether or not all the elements of the attack successful-time environment information are included in the elements of the attack failure-time environment information.

In the example in FIG. 9, the result of the comparison indicates that all the elements of the attack successful-time environment information #1 are included in the elements of the attack failure-time environment information #3, and thus the difference between the environment information #1 and the environment information #3 is found. All the elements of the attack successful-time environment information #1(a, b, c, d) are included in the elements of the attack failure-time environment information #3(a, b, c, d, f), and thus the difference is the element (f).

Additionally, in the example in FIG. 9, the result of the comparison indicates that all the elements of the attack successful-time environment information #2 are included in the elements of the attack failure-time environment information #4, and thus the difference between the elements of the environment information #2 and the environment information #4 is found. All the elements of the attack successful-time environment information #2(a, c, f) are included in the elements of the attack failure-time environment information #4(a, c, f, g), and thus the difference is the element (g).

Next, the attack success condition generation unit 300 attaches, to the difference, exclusion information indicating a failed attack. In the example in FIG. 9, exclusion information "not" is attached to the element f indicating the difference for the attack M #1 (not f). Additionally, exclusion information "not" is attached to the element g indicating the difference for the attack M #2 (not g).

Next, the attack success condition generation unit 300 adds the difference, to which the exclusion information has been attached, to the attack successful-time environment information. In the example in FIG. 9, an element (not f) in which the exclusion information is attached to the elements (a, b, c, d) of the environment information #1 is added (a, b, c, d, not f). Additionally, an element (not g) in which the exclusion information is attached to the elements (a, c, f) of the environment information #2 is added (a, c, f, not g).

Next, the attack success condition generation unit 300 generates the attack success conditions using the added environment information. In the example in FIG. 9, the attack success conditions (a, b, c, d, not f) or (a, c, f, not g) indicated in FIG. 9 are generated using the environment information #1 and the environment information #2 to which elements attached with the exclusion information have been added.

The attack-time history generation unit 400 finds the difference between the no-attack history information and the attack successful-time history information, for each instance of the same attack successful-time environment information, and extracts attack successful-time common history information, which is common to the difference which has been found. Additionally, the attack-time history generation unit 400 extracts the difference between the no-attack history information and the attack failure-time history information, for each attack failure-time environment information, and extracts attack failure-time common history information, which is common to all the attack failure-time environment information. The attack-time history generation unit 400 then generates an attack history using the attack successful-time common history information and the attack failure-time common history information.

Figure 10:
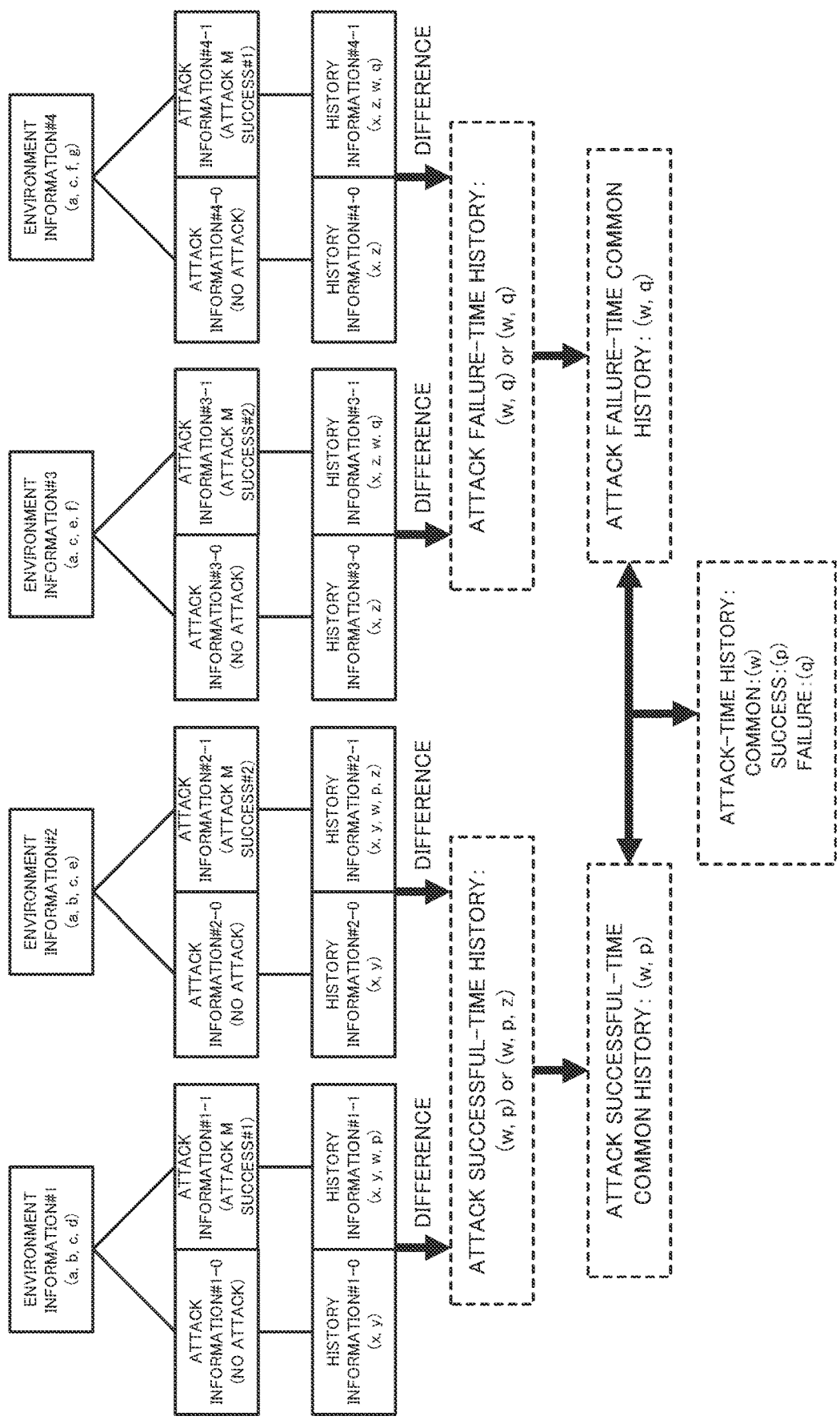
FIG. 10 is a diagram illustrating the generation of attack-time history information.

The attack-time history generation unit 400 will be described in detail with reference to FIG. 10. FIG. 10 is a diagram illustrating the generation of a history during an attack.

When the environment information and the attack information indicated by Math 9 is collected by the collection unit 200 described above, the attack-time history generation unit 400 extracts the no-attack history information #1-0, related to the attack information #1-0(x, y), and the attack successful-time history information #1-1(x, y, w, p), related to the attack information #1-1, which correspond to the environment information #1 expressing the environment in which the attack M was successful.

Additionally, the attack-time history generation unit 400 extracts the no-attack history information #2-0(x, y), related to the attack information #2-0, and the attack successful-time history information #2-1(x, y, w, p, z), related to the attack information #2-1 (attack success), which correspond to the environment information #2 in which the attack M was successful.

Note that the elements (x, y, w, p, z) of the aforementioned history information express logs for OSs, programs, communication, process launching and termination, command execution, file access, and the like, as mentioned above.

Next, the attack-time history generation unit 400 finds a difference (w, p) between the extracted no-attack history information #1-0 and the attack successful-time history information #1-1, and a difference (w, p, z) between the no-attack history information #2-0 and the attack successful-time history information #2-1.

Next, the attack-time history generation unit 400 extracts the common elements between the differences (w, p) and (w, p, z) when an attack is successful, and generates attack successful-time common history information (w, p).

The attack-time history generation unit 400 extracts the no-attack history information #3-0, related to the attack information #3-0(x, z), and the attack successful-time history information #3-1(x, z, w, q), related to the attack information #3-1, which correspond to the environment information #3 expressing an environment in which the attack M has failed.

Additionally, the attack-time history generation unit 400 extracts the no-attack history information #4-0(x, z), related to the attack information #4-0, and the attack failure-time history information #4-1(x, z, q), related to the attack information #4-1 (attack failure), which correspond to the environment information #4 in which the attack M has failed.

Next, the attack-time history generation unit 400 finds a difference (w, q) between the extracted no-attack history information #3-0 and the attack failure-time history information #3-1, and a difference (w, q) between the no-attack history information #4-0 and the attack failure-time history information #4-1.

Next, the attack-time history generation unit 400 extracts the common elements between the differences (w, q) and (w, q) when an attack has failed, and generates attack failure-time common history information (w, q).

Next, using the attack successful-time common history information (w, p) and the attack failure-time common history information (w, q), the attack-time history generation unit 400 extracts the element (w) which is common between the attack successful-time common history information and the attack failure-time common history information, the element (p) appearing only when an attack is successful, and the element (q) appearing only when an attack has failed, and generates attack-time history information such as that indicated by the attack history illustrated in FIG. 10.

The rule generation unit 500 generates rules for analyzing the attack on the simulation system. Specifically, the rule generation unit 500 generates attack successful-time observation rules, attack successful-time result rules, attack-time observation rules, and attack failure-time observation rules.

The generation of the attack successful-time observation rules will be described.

The rule generation unit 500 generates the attack successful-time observation rules using the elements of the history information collected only when an attack is successful, among the attack successful-time common history information. The rule generation unit 500 generates attack successful-time observation rules such as those indicated by Math 10, for example.
Math 10
SuccessAttack(_host, attack M):—
Observe(_host, network, p):—
SuccessAttack(_host, attack M) indicates that the attack M on the host computer (_host) has succeeded. Observe (_host, network, p) indicates the element (p) of the history information collected (observed) when the attack M on the host computer (_host) has succeeded. The "network" in Math 10 indicates that the type of the element (p) is a log pertaining to the network. In addition to the "network" log pertaining to the network, there are other types of elements, e.g., a log "log", a log "file" pertaining to files, a log "memory" pertaining to memory, and the like.

The generation of attack successful-time result rules will be described.

When the elements of the history information collected when an attack is successful are elements pertaining to the behavior of a process, the rule generation unit 500 generates the attack successful-time result rules using the attack success conditions. The rule generation unit 500 generates attack successful-time result rules such as those indicated by Math 11, for example.
Math 11
ExecCode(_attacker, _host, p):—
Satisfy(_host, os, a)
Satisfy(_host, service, b)
Satisfy(_attacker, privilege, c)
Satisfy(_host, network, d)
NotSatisfy(_host, software, f)
ExecCode(_attacker, _host, p) indicates that an attacker (_attacker) has executed a command against the host computer (host) when the element (p) of the history information collected when an attack is successful is an element pertaining to the behavior of the process.

Note that in the example of Math 11, the element (p) is a command execution log, and thus the rule generation unit 500 selects the rule "ExecCode", which indicates command execution.

In addition to "ExecCode," the rule generation unit 500 selects, for example, "DataTamper" for data tampering, "DataAccess" for data access, or the like, in accordance with the type of element pertaining to the behavior of the process.

Satisfy(_host, os, a), Satisfy(_host, service, b), Satisfy (_attacker, privilege, c), Satisfy(_host, network, d), and NotSatisfy(_host, software, f) express the attack success conditions (a, b, c, d, not f) when the attack M has succeeded.

Because the conditions for the attack M to be successful are that there is an environment expressed by the elements of the environment information (a, b, c, d) and there is no environment expressed by the element (f), the elements (a, b, c, d) are added to Satisfy( ), which indicates that there is an element of the environment information, and the element (f) is added to NotSatisfy( ), which indicates that there is no element of the environment information.

In Math 11, element (a) indicates the OS "os", element (b) indicates a service "service", element (c) indicates privileges "privilege", element (d) indicates the network "network", and element (f) indicates software "software".

The generation of attack successful-time result rules will be described.

The rule generation unit 500 generates the attack-time observation rules using the elements of the history information common between the attack successful-time common history information and the attack failure-time common history information. The rule generation unit 500 generates attack successful-time observation rules such as those indicated by Math 12, for example.
Math 12
ExecuteAttack(_host, attack M):—
Observe(_host, log, w):—
ExecuteAttack(_host, attack M) indicates that the attack M on the host computer (_host) has been carried out. Observe(_host, network, p) indicates the element (w) that is observed both in successful and failed cases when the attack M is carried out on the host computer (_host). The "log" in Math 12 indicates that the type of the element (w) is related to the log.

The generation of the attack failure-time observation rules will be described.

The rule generation unit 500 generates the attack failure-time observation rules using the elements of the history information collected only when an attack has failed, among the attack failure-time common history information. The rule generation unit 500 generates attack failure-time observation rules such as those indicated by Math 13, for example.

Math 13

FailedAttack(_host, attack M):—
Observe(_host, log, q):—

FailedAttack(_host, attack M) indicates that the attack M on the host computer (_host) has failed. Observe(_host, log, q) indicates the element (q) of the history information collected (observed) when the attack M on the host computer (_host) has failed. The "log" in Math 5 indicates that the type of the element (q) is related to the log.

System Configuration

Figure 11:
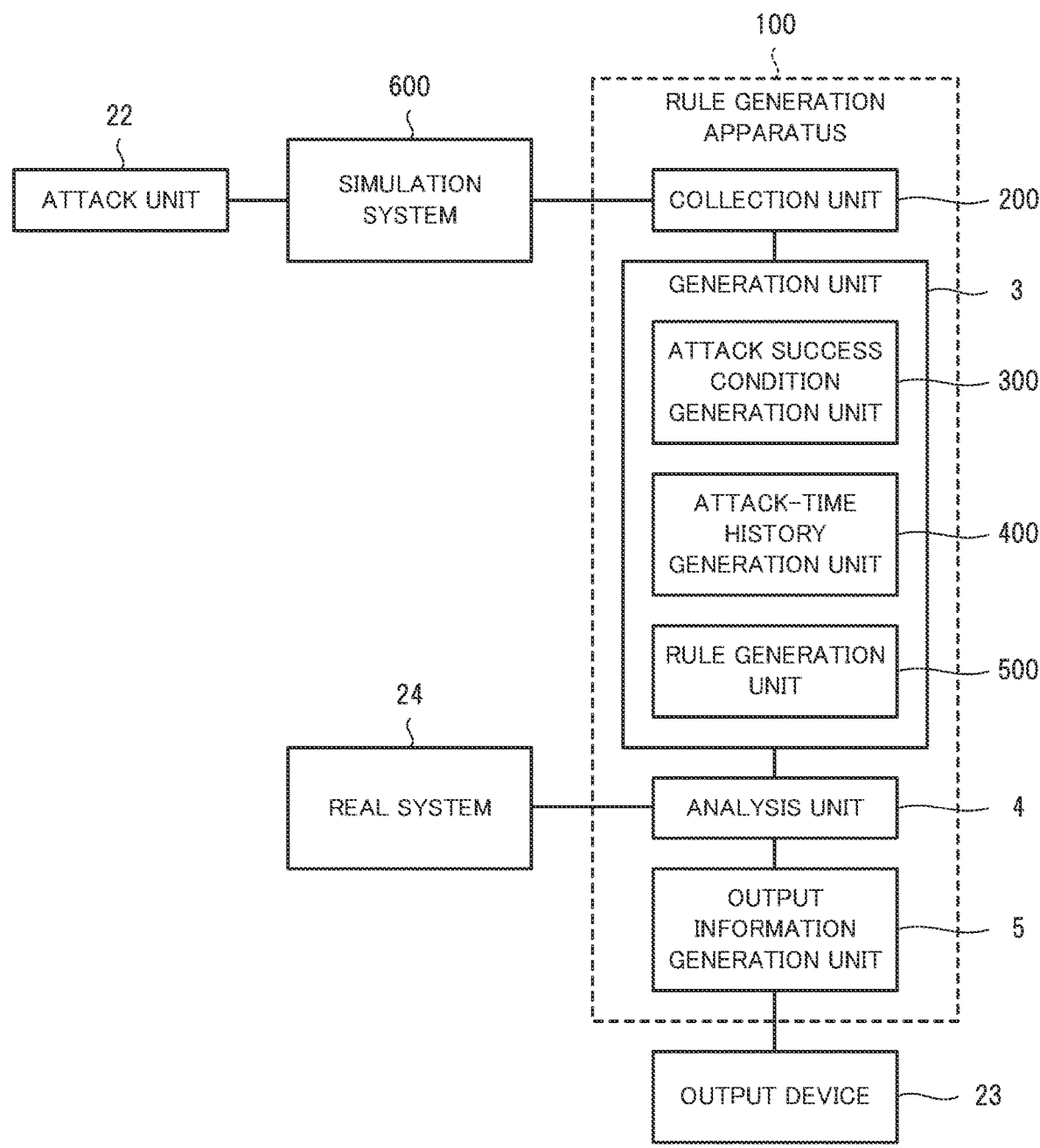
FIG. 11 is a diagram illustrating an example of a system including the rule generation apparatus.

The configuration of a system according to the second example embodiment will be described with reference to FIG. 11. FIG. 11 is a diagram illustrating an example of a system including the rule generation apparatus. Note that the output device 23 and the real system 24 have been described in the first example embodiment, and will therefore not be described here.

As illustrated in FIG. 11, the rule generation apparatus 100 according to the second example embodiment includes the collection unit 200, the generation unit 3, the analysis unit 4, and the output information generation unit 5. Additionally, as illustrated in FIG. 11, the system including the rule generation apparatus 100 includes the attack unit 22, the output device 23, the real system 24, and a simulation system 600.

As illustrated in FIG. 11, in the second example embodiment, the generation unit 3 includes the above-described attack success condition generation unit 300, attack-time history generation unit 400, and rule generation unit 500.

The simulation system 600 is a system that simulates the real system 24 to be attacked. The simulation system 600 is a system in which an environment is constructed for the purpose of reproducing an attack.

The simulation system 600 is a system that simulates a damage environment of an organization that is the target of an attack. The simulation system 600 may, for example, include a system that simulates the damage environment and a system that simulates an attack environment for attacking the organization that is the target of the attack. Furthermore, the simulation system 600 may implement the environment for reproducing the attack in a virtual environment.

The attack unit 22 according to the second example embodiment carries out an attack on the simulation system 600 on the basis of an attack scenario. Specifically, the attack unit 22 carries out an attack on part or all of the simulation system 600, using a plurality of different attack scenarios. In this manner, the attack unit 22 can attempt various conceivable attacks on the simulation system 600 while changing the attack scenario, which makes it possible to cover all conceivable attacks.

The analysis unit 4 according to the second example embodiment analyzes the attack using the environment information, the history information, and the attack information collected from the system in question (the real system 24), as well as the attack successful-time observation rules, the attack successful-time result rules, the attack-time observation rules, the attack failure-time observation rules, or two or more thereof.

Apparatus Operations

Next, the operations of the rule generation apparatus 100 according to the second example embodiment will be described with reference to FIG. 12. The following descriptions will refer to FIGS. 8 to 11 as appropriate. In the second example embodiment, a rule generation method is implemented by operating the rule generation apparatus 100. As such, the following descriptions of the operations of the rule generation apparatus will be given in place of descriptions of the rule generation method according to the second example embodiment.

A collection process according to the second example embodiment will be described.

Figure 12:
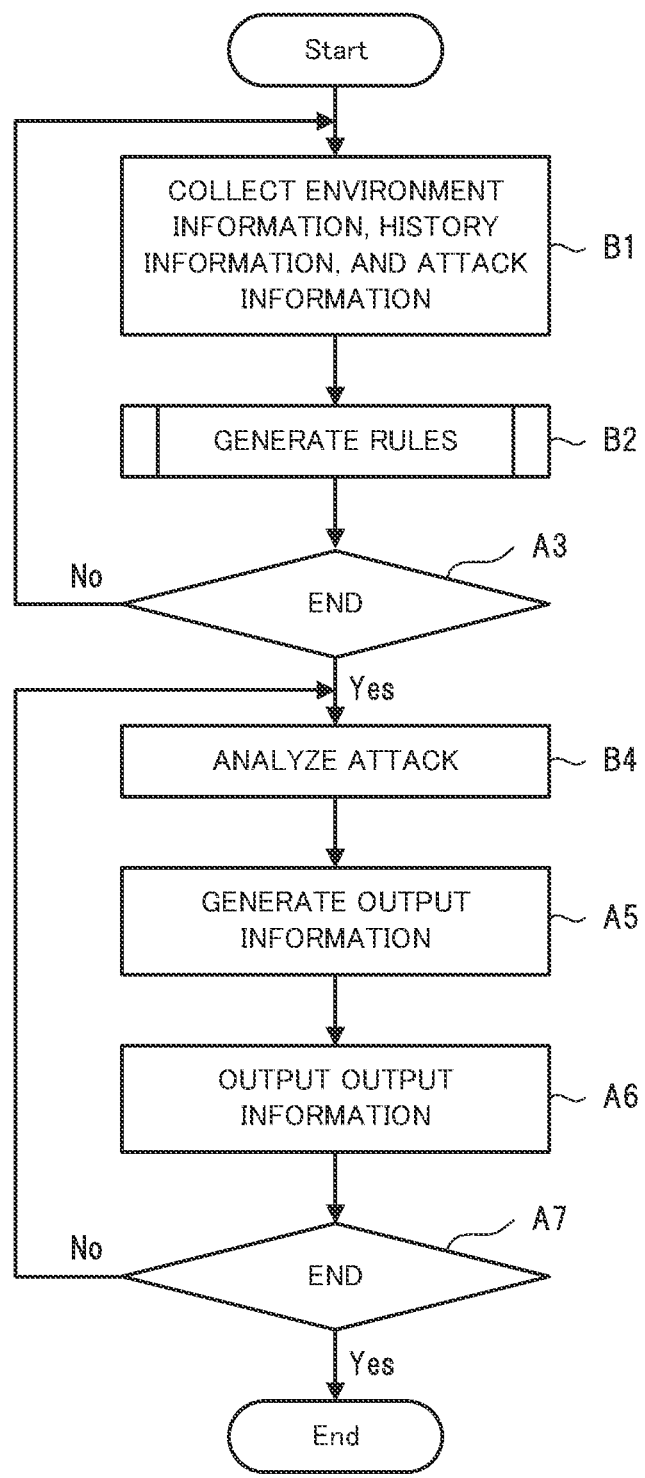
FIG. 12 is a diagram illustrating an example of operations of the rule generation apparatus.

As illustrated in FIG. 12, first, the collection unit 200 collects the environment information of the simulation system 600 that has been attacked on the basis of the attack scenario, as well as the history information and the attack information, and stores the collected information in a storage unit (not shown) (step B1).

Specifically, in step B1, the collection unit 200 collects the environment information and the history information for each of environments in a no-attack state. Additionally, in step B1, the collection unit 200 collects the environment information and the history information for each of the environments in an attack state. Additionally, in step B1, the collection unit 200 stores the information that has been collected in the storage unit as collected information.

Next, the generation unit 3 generates an attack knowledge base using the environment information pertaining to the simulation system 600 attacked using the attack scenario, the history information, and the attack information, and stores the attack knowledge base in the storage unit (step B2). In step B2, the generation unit 3 generates rules such as the attack successful-time observation rules, the attack successful-time result rules, the attack-time observation rules, the attack failure-time observation rules, or the like.

Specifically, in step B2, the attack success condition generation unit 300 uses the attack information to extract, from the environment information, attack successful-time environment information and attack failure-time environment information. Next, the attack success condition generation unit 300 finds a difference between the attack failure-time environment information including all the elements of the attack successful-time environment information, and that attack successful-time environment information.

Next, in step B2, the attack success condition generation unit 300 adds, to the difference that has been found, exclusion information indicating a failed attack. Next, the attack success condition generation unit 300 adds the difference, to which the exclusion information has been attached, to the attack successful-time environment information. The attack success condition generation unit 300 then generates the attack success conditions using the added environment information.

Next, in step B2, the attack-time history generation unit 400 finds the difference between the no-attack history information and the attack successful-time history information, for each instance of the same attack successful-time environment information, and extracts attack successful-time common history information, which is common to the difference which has been found.

Additionally, the attack-time history generation unit 400 extracts the difference between the no-attack history information and the attack failure-time history information, for each instance of the same attack failure-time environment information, and extracts attack failure-time common history information, which is common to all the attack failure-time environment information. The attack-time history generation unit 400 then generates an attack history using the attack successful-time common history information and the attack failure-time common history information.

Next, in step B2, the rule generation unit 500 generates rules for analyzing the attack on the simulation system. Specifically, the rule generation unit 500 generates attack successful-time observation rules, attack successful-time result rules, attack-time observation rules, and attack failure-time observation rules.

Next, if an instruction to end the rule generation processing has been obtained (A3: Yes), the rule generation apparatus 100 ends the rule generation processing, whereas if the rule generation processing is to be continued (A3: No), the sequence moves to step B1.

Next, the analysis unit 4 analyzes the attack using the environment information, the history information, and the attack information collected from the system in question (the real system 24), as well as the attack successful-time observation rules, the attack successful-time result rules, the attack-time observation rules, the attack failure-time observation rules, or two or more thereof (step B4).

Next, using the analysis result, the output information generation unit 5 generates the output information to be used for output to the output device 23 (step A5).

Next, the output information generation unit 5 outputs the generated output information to the output device 23 (step A6). Then, if an instruction to end the analysis support processing has been obtained (A7: Yes), the rule generation apparatus 1 ends the analysis support processing, whereas if the analysis support processing is to be continued (A7: No), the sequence moves to step B4.

Effect of Second Example Embodiment

As described thus far, according to the second example embodiment, an attack is carried out on a simulation system using an attack scenario; environment information, history information, and attack information are collected from the simulation system which has been attacked; and rules for analyzing the attack (security operations) can be generated on the basis of the collected information. In other words, in the second example embodiment, practical rules that sufficiently cover domain knowledge can be generated automatically.

Additionally, presenting the analysis results to the operators and analysts analyzing an attack makes it possible to support security operations.

Program

A program according to the second example embodiment may be any program that causes a computer to execute steps B1, B2, A3, B4, and A5 to A7 illustrated in FIG. 12. The rule generation apparatus and the rule generation method according to the second example embodiment can be implemented by installing the program in a computer and executing the program. In this case, a processor of the computer performs the processing by functioning as the collection unit 200, the generation unit 3 (the attack success condition generation unit 300, the attack-time history generation unit 400, and the rule generation unit 500), the analysis unit 4, and the output information generation unit 5.

The program according to the second example embodiment may be executed by a computer system constructed from a plurality of computers. In this case, for example, each computer may function as any of the collection unit 200, the generation unit 3 (the attack success condition generation unit 300, the attack-time history generation unit 400, and the rule generation unit 500), the analysis unit 4, and the output information generation unit 5.

Physical Configuration

Figure 13:
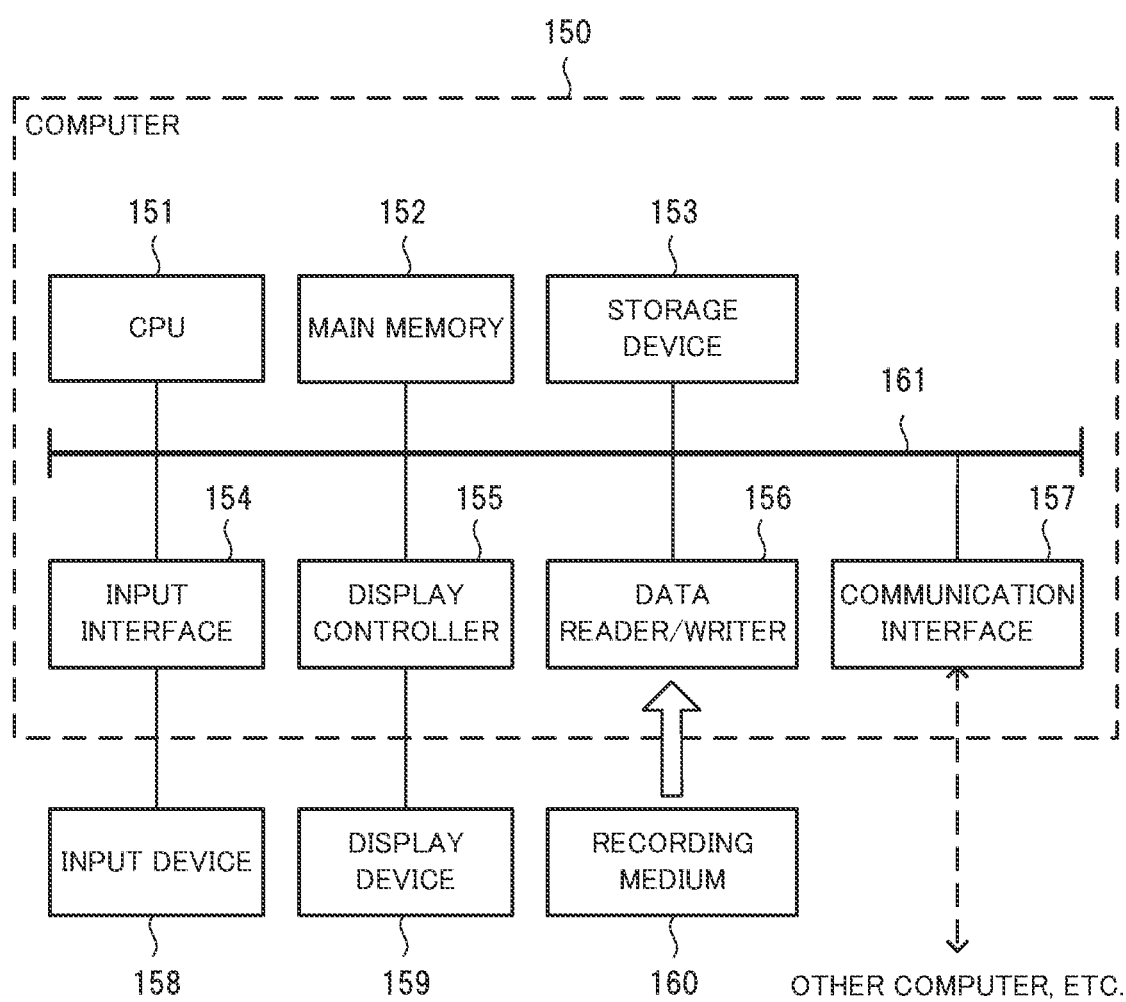
FIG. 13 is a diagram illustrating an example of a computer realizing a rule generation apparatus and an analysis support apparatus.

A computer that realizes the rule generation apparatus and the analysis support apparatus by executing the program according to the example embodiments will be described here with reference to FIG. 13. FIG. 13 is a block diagram illustrating an example of a computer realizing the rule generation apparatus and the analysis support apparatus according to the example embodiments.

As illustrated in FIG. 13, a computer 150 includes a CPU 151, main memory 152, a storage device 153, an input interface 154, a display controller 155, a data reader/writer 156, and a communication interface 157. These units are connected by a bus 161 so as to be capable of data communication with each other. Note that in addition to, or instead of, the CPU 151, the computer 150 may include a GPU (Graphics Processing Unit) or a FPGA (Field-Programmable Gate Array).

The CPU 151 loads the program (code) according to the present example embodiment, which is stored in the storage device 153, into the main memory 152, and executes the program according to a predetermined sequence, thereby carrying out various types of operations. The main memory 152 is typically a volatile storage device such as DRAM (Dynamic Random Access Memory) or the like. The program according to the present example embodiment is stored in a computer-readable recording medium 160 and provided in such a state. Note that the program according to the present example embodiment may be distributed over the Internet, which is connected via the communication interface 157.

In addition to a hard disk drive, a semiconductor storage device such as Flash memory or the like can be given as a specific example of the storage device 153. The input interface 154 facilitates data transfer between the CPU 151 and an input device 158 such as a keyboard and a mouse. The display controller 155 can be connected to a display device 159, and controls displays made in the display device 159.

The data reader/writer 156 facilitates data transfer between the CPU 151 and the recording medium 160, reads out programs from the recording medium 160, and writes results of processing performed by the computer 150 into the recording medium 160. The communication interface 157 facilitates data exchange between the CPU 151 and other computers.

A generic semiconductor storage device such as CF (Compact Flash (registered trademark)), SD (Secure Digital), or the like, a magnetic recording medium such as a flexible disk or the like, an optical recording medium such as a CD-ROM (Compact Disk Read Only Memory) or the like, and so on can be given as specific examples of the recording medium 160.

Note that the rule generation apparatus according to the example embodiment can also be realized using hardware corresponding to the respective units, instead of a computer in which a program is installed. Furthermore, the rule generation apparatus may be partially realized by a program, with the remaining parts realized by hardware.

Supplementary Notes

The following supplementary notes are disclosed with respect to the foregoing example embodiments. All or parts of the above-described example embodiments can be expressed as Supplementary Note 1 to Supplementary Note 15, described hereinafter, but are not intended to be limited to the following descriptions.

Supplementary Note 1

A rule generation apparatus including:
a collection unit that collects, from a simulation system simulating a system to be attacked, environment information expressing an environment that is constructed in the simulation system, history information recorded in the simulation system, and attack information expressing whether or not an attack has been carried out on the simulation system and whether the attack has succeeded or failed;

an attack success condition generation unit that generates an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;

an attack-time history generation unit that generates attack-time history information by finding a difference between no-attack history information and attack successful-time history information for each of the attack successful-time environment information and extracting attack successful-time common history information common with the difference found from when the attack is successful, finding a difference between the no-attack history information and attack failure-time history information for each of the same attack failure-time environment information and extracting attack failure-time common history information common with the difference found from when the attack fails, and using the attack successful-time common history information and the attack failure-time common history information; and a rule generation unit that generates a rule using the attack success condition and the history information.

Supplementary Note 2

The rule generation apparatus according to Supplementary Note 1, wherein the rule generation unit generates an attack successful-time observation rule using an element of the history information collected only when the attack is successful, among the attack successful-time common history information.

Supplementary Note 3

The rule generation apparatus according to Supplementary Note 1 or 2, wherein when the element of the history information collected only when the attack is successful, among the attack successful-time common history information, is an element pertaining to behavior of a process, the rule generation unit generates an attack successful-time result rule using the attack success condition.

Supplementary Note 4

The rule generation apparatus according to any one of Supplementary Notes 1 to 3, wherein the rule generation unit generates an attack-time observation rule using an element of history information common between the attack successful-time common history information and the attack failure-time common history information.

Supplementary Note 5

The rule generation apparatus according to any one of Supplementary Notes 1 to 4, wherein the rule generation unit generates an attack failure-time observation rule using an element of the history information collected only when the attack has failed, among the attack successful-time common history information.

Supplementary Note 6

A rule generation method including:

a collection step of collecting, from a simulation system simulating a system to be attacked, environment information expressing an environment in which the simulation system is constructed, history information recorded in the simulation system, and attack information expressing whether or not an attack has been carried out on the simulation system and whether the attack has succeeded or failed;

an attack success condition generation step of generating an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;

an attack history generation step of generating attack-time history information by finding a difference between no-attack history information and attack successful-time history information for each of the attack successful-time environment information and extracting finding attack successful-time common history information common with the difference found from when the attack is successful, finding a difference between the no-attack history information and attack failure-time history information for each of the same attack failure-time environment information and extracting attack failure-time common history information common with the difference found from when the attack fails, and using the attack successful-time common history information and the attack failure-time common history information; and a rule generation step of generating a rule using the attack success condition and the history information.

Supplementary Note 7

The rule generation method according to Supplementary Note 6, wherein in the rule generation step, an attack successful-time observation rule is generated using an element of the history information collected only when the attack is successful, among the attack successful-time common history information.

Supplementary Note 8

The rule generation method according to Supplementary Note 6 or 7, wherein in the rule generation step, when the element of the history information collected only when the attack is successful, among the attack successful-time common history information, is an element pertaining to behavior of a process, an attack successful-time result rule is generated using the attack success condition.

Supplementary Note 9

The rule generation method according to any one of Supplementary Notes 6 to 8, wherein in the rule generation step, an attack-time observation rule is generated using an element of history information common between the attack successful-time common history information and the attack failure-time common history information.

Supplementary Note 10

The rule generation method according to any one of Supplementary Notes 6 to 9,
wherein in the rule generation step, an attack failure-time observation rule is generated using an element of the history information collected only when the attack has failed, among the attack successful-time common history information.

Supplementary Note 11

A computer-readable recording medium that includes a program recorded thereon, the program including instructions that causes a computer to carry out:
a collection step of collecting, from a simulation system simulating a system to be attacked, environment information expressing an environment in which the simulation system is constructed, history information recorded in the simulation system, and attack information expressing whether or not an attack has been carried out on the simulation system and whether the attack has succeeded or failed;
an attack success condition generation step of generating an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;
an attack history generation step of generating attack-time history information by finding a difference between no-attack history information and attack successful-time history information for each of the attack successful-time environment information and extracting attack successful-time common history information common with the difference found from when the attack is successful, finding a difference between the no-attack history information and attack failure-time history information for each of the same attack failure-time environment information and extracting attack failure-time common history information common with the difference found from when the attack fails, and using the attack successful-time common history information and the attack failure-time common history information; and
a rule generation step of generating a rule using the attack success condition and the history information.

Supplementary Note 12

The computer-readable recording medium according to Supplementary Note 11,
wherein in the rule generation step, an attack successful-time observation rule is generated using an element of the history information collected only when the attack is successful, among the attack successful-time common history information.

Supplementary Note 13

The computer-readable recording medium according to Supplementary Note 11 or 12,
wherein in the rule generation step, when the element of the history information collected only when the attack is successful, among the attack successful-time common history information, is an element pertaining to behavior of a process, an attack successful-time result rule is generated using the attack success condition.

Supplementary Note 14

The computer-readable recording medium according to any one of Supplementary Notes 11 to 13,
wherein in the rule generation step, an attack-time observation rule is generated using an element of history information common between the attack successful-time common history information and the attack failure-time common history information.

Supplementary Note 15

The computer-readable recording medium according to any one of Supplementary Notes 11 to 14,
wherein in the rule generation step, an attack failure-time observation rule is generated using an element of the history information collected only when the attack has failed, among the attack successful-time common history information.

While the invention has been described above with reference to example embodiments, the invention is not intended to be limited to the above example embodiments. Many variations can be made, by one of ordinary skill in the art, on the configuration and details of the invention without departing from the scope of the invention.

This application is based upon and claims the benefit of priority from PCT/JP2019/022643, filed internationally on Jun. 6, 2019, the disclosure of which is incorporated herein in its entirety by reference.

INDUSTRIAL APPLICABILITY

According to the invention as described above, practical rule used in security operations can be generated automatically. The invention is useful in fields where practical rules that sufficiently cover domain knowledge are required.

REFERENCE SIGNS LIST 1, 100 Rule generation apparatus
2, 200 Collection unit
3 Generation unit
3a Attack success rule generation unit
3b Attack failure rule generation unit
3c Attack-time observation rule generation unit
3d Attack successful-time observation rule generation unit
3e Attack failure-time observation rule generation unit
3f Attack successful-time result rule generation unit
4 Analysis unit
5 Output information generation unit
20 Attack execution environment unit
20a Simulation system
21 Construction unit
22 Attack unit
23 Output device
24 Real system
61 Analysis support apparatus
62 Storage unit
150 Computer
151 CPU
152 Main memory
153 Storage device
154 Input interface
155 Display controller
156 Data reader/writer
157 Communication interface 158 Input device
159 Display device
160 Recording medium
161 Bus
300 Attack success condition generation unit
400 Attack-time history generation unit
500 Rule generation unit
600 Simulation system

The invention claimed is:

1. A system comprising:
   at least one processor;
   a memory storing instructions executable by the at least one processor to:
   for each environment of a plurality of environments in which a simulation system is constructed and is simulating a system to be attacked, collect, from the simulation system, environment information expressing the each environment, history information recorded in the simulation system, and attack information expressing whether or not an attack has been carried out on the simulation system and whether the attack has succeeded or failed;
   for each environment, generate an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;
   generate attack-time history information by finding a difference between no-attack history information and attack successful-time history information for the attack successful-time environment information for each environment and extracting attack successful-time common history information common to the difference when the attack is successful, finding a difference between the no-attack history information and attack failure-time history information for the attack failure-time environment information for each environment and extracting attack failure-time common history information common to the difference when the attack fails, and using the attack successful-time common history information and the attack failure-time common history information;
   generate a rule using the attack success condition and the history information;
   analyze a cyberattack on an actual system using the generated rule to generate a mitigation action to counteract and/or mitigate the cyberattack; and
   implement the mitigation action to mitigate the cyberattack on the actual system.

2. The rule generation apparatus according to claim 1, wherein the processor generates an attack successful-time observation rule using an element of the history information collected only when the attack is successful, among the attack successful-time common history information.

3. The rule generation apparatus according to claim 2, wherein when the element of the history information collected only when the attack is successful pertains to behavior of a process, the processor generates an attack successful-time result rule using the attack success condition.

4. The rule generation apparatus according to claim 1, wherein the processor generates an attack-time observation rule using an element of history information common to both the attack successful-time common history information and the attack failure-time common history information.

5. The rule generation apparatus according to claim 1, wherein the processor generates an attack failure-time observation rule using an element of the history information collected only when the attack has failed, among the attack successful-time common history information.

6. A rule generation method performed by a computer and comprising:
   for each environment of a plurality of environments in which a simulation system is constructed and is simulating a system to be attacked, collecting, from the simulation system, environment information expressing the each environment, history information recorded in the simulation system, and attack information expressing whether or not an attack has been carried out on the simulation system and whether the attack has succeeded or failed;
   for each environment, generating an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;
   generating attack-time history information by finding a difference between no-attack history information and attack successful-time history information for the attack successful-time environment information for each environment and extracting attack successful-time common history information common to the difference when the attack is successful, finding a difference between the no-attack history information and attack failure-time history information for the attack failure-time environment information for each environment and extracting attack failure-time common history information common to the difference when the attack fails, and using the attack successful-time common history information and the attack failure-time common history information;
   generating a rule using the attack success condition and the history information;
   analyzing a cyberattack on an actual system using the generated rule to generate a mitigation action to counteract and/or mitigate the cyberattack; and
   implementing the mitigation action to mitigate the cyberattack on the actual system.

7. The rule generation method according to claim 6, wherein in generating the rule, an attack successful-time observation rule is generated using an element of the history information collected only when the attack is successful, among the attack successful-time common history information.

8. The rule generation method according to claim 7,
wherein in generating the rule, when the element of the history information collected only when the attack is successful pertains to behavior of a process, an attack successful-time result rule is generated using the attack success condition.

9. The rule generation method according to claim 6,
wherein in generating the rule, an attack-time observation rule is generated using an element of history information common to both the attack successful-time common history information and the attack failure-time common history information.

10. The rule generation method according to claim 6,
wherein in generating the rule, an attack failure-time observation rule is generated using an element of the history information collected only when the attack has failed, among the attack successful-time common history information.

11. A non-transitory computer-readable recording medium storing a program executable by a computer to carry out:
for each environment of a plurality of environments in which a simulation system is constructed and is simulating a system to be attacked, collecting, from the simulation system, environment information expressing the each environment, history information recorded in the simulation system, and attack information expressing whether or not an attack has been carried out on the simulation system and whether the attack has succeeded or failed;
for each environment, generating an attack success condition by extracting attack successful-time environment information and attack failure-time environment information from the environment information using the attack information, finding a difference between the attack failure-time environment information including all of the attack successful-time environment information and the attack successful-time environment information, attaching exclusion information indicating that the attack has failed to the difference, and adding the difference attached with the exclusion information to the attack successful-time environment information;
generating attack-time history information by finding a difference between no-attack history information and attack successful-time history information for the attack successful-time environment information for each environment and extracting attack successful-time common history information common to the difference when the attack is successful, finding a difference between the no-attack history information and attack failure-time history information for the attack failure-time environment information for each environment and extracting attack failure-time common history information common to the difference when the attack fails, and using the attack successful-time common history information and the attack failure-time common history information;
generating a rule using the attack success condition and the history information;
analyzing a cyberattack on an actual system using the generated rule to generate a mitigation action to counteract and/or mitigate the cyberattack; and
implementing the mitigation action to mitigate the cyberattack on the actual system.

12. The non-transitory computer-readable recording medium according to claim 11,
wherein in generating the rule, an attack successful-time observation rule is generated using an element of the history information collected only when the attack is successful, among the attack successful-time common history information.

13. The non-transitory computer-readable recording medium according to claim 12,
wherein in generating the rule, when the element of the history information collected only when the attack is successful pertains to behavior of a process, an attack successful-time result rule is generated using the attack success condition.

14. The non-transitory computer-readable recording medium according to claim 11,
wherein in generating the rule, an attack-time observation rule is generated using an element of history information common to both the attack successful-time common history information and the attack failure-time common history information.

15. The non-transitory computer-readable recording medium according to claim 11,
wherein in generating the rule, an attack failure-time observation rule is generated using an element of the history information collected only when the attack has failed, among the attack successful-time common history information.

* * * * *